United States Patent
HomChaudhuri et al.

(10) Patent No.: US 10,159,047 B2
(45) Date of Patent: Dec. 18, 2018

(54) TECHNIQUES FOR MANAGING SIFS-BURSTING IN WLAN SYSTEM

(71) Applicant: QUALCOMM Incorporated, San Diego, CA (US)

(72) Inventors: Sandip HomChaudhuri, San Jose, CA (US); Sumeet Kumar, San Jose, CA (US); James Simon Cho, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 14/715,230

(22) Filed: May 18, 2015

(65) Prior Publication Data

US 2016/0345270 A1 Nov. 24, 2016

(51) Int. Cl.
| | |
|---|---|
| *H04W 4/00* | (2018.01) |
| *H04W 52/08* | (2009.01) |
| *H04W 52/54* | (2009.01) |
| *H04L 5/00* | (2006.01) |
| *H04L 29/06* | (2006.01) |
| *H04L 1/00* | (2006.01) |
| *H04L 1/16* | (2006.01) |
| *H04W 52/36* | (2009.01) |

(52) U.S. Cl.
CPC ........... *H04W 52/08* (2013.01); *H04L 1/0003* (2013.01); *H04L 1/0009* (2013.01); *H04L 1/1671* (2013.01); *H04L 5/0055* (2013.01); *H04L 69/22* (2013.01); *H04W 52/54* (2013.01); *H04L 1/0001* (2013.01); *H04W 52/362* (2013.01)

(58) Field of Classification Search
CPC ....... H04W 52/08; H04L 5/0055; H04L 69/22
USPC .......................................................... 370/329
See application file for complete search history.

(56) References Cited

U.S. PATENT DOCUMENTS

| | | | |
|---|---|---|---|
| 8,432,938 B2 | 4/2013 | Singh et al. | |
| 8,982,803 B1 * | 3/2015 | Zhang .................. | H04B 7/0619 370/329 |
| 2005/0050219 A1 | 3/2005 | Choi et al. | |
| 2007/0054690 A1 | 3/2007 | Wu et al. | |

(Continued)

FOREIGN PATENT DOCUMENTS

EP 1991010 A1 11/2008

OTHER PUBLICATIONS

ISA/EP, International Search Report and Written Opinion of the International Searching Authority, Int'l App. No. PCT/US2016/028774, dated Jul. 1, 2016, European Patent Office, Rijswijk, NL, 12 pgs.

(Continued)

*Primary Examiner* — Ricky Q Ngo
*Assistant Examiner* — Ellen Kirillova
(74) *Attorney, Agent, or Firm* — Holland & Hart LLP/Qualcomm

(57) ABSTRACT

Methods and apparatuses for providing closed-loop power control during a short inter-frame space (SIFS) burst are described herein. A method includes receiving feedback associated with transmit power used to transmit a first data packet in a SIFS burst. The method also includes adjusting at least the transmit power, or a modulation and coding scheme (MCS), or a combination thereof, used to transmit a second data packet of the SIFS burst based at least in part on the received feedback.

30 Claims, 14 Drawing Sheets

(56) References Cited

U.S. PATENT DOCUMENTS

| | | | |
|---|---|---|---|
| 2007/0058575 A1* | 3/2007 | Kwon | H04W 52/0238 |
| | | | 370/318 |
| 2007/0275671 A1* | 11/2007 | Hwang | H04B 1/1615 |
| | | | 455/73 |
| 2008/0225811 A1 | 9/2008 | Wentink | |
| 2010/0203838 A1 | 8/2010 | Ding | |
| 2011/0261731 A1* | 10/2011 | Lee | H04L 5/1469 |
| | | | 370/280 |
| 2013/0142185 A1 | 6/2013 | Leizerovich et al. | |
| 2013/0176864 A1 | 7/2013 | Quan et al. | |
| 2014/0293868 A1* | 10/2014 | Levanen | H04L 1/1607 |
| | | | 370/328 |
| 2015/0195820 A1* | 7/2015 | Jung | H04L 5/0073 |
| | | | 370/329 |
| 2015/0281993 A1* | 10/2015 | Chen | H04W 24/10 |
| | | | 370/338 |
| 2016/0080115 A1* | 3/2016 | Josiam | H04L 5/0094 |
| | | | 370/329 |

OTHER PUBLICATIONS

Viswanathan H., et al., "Adaptive Transmit Power Control Based on Signal Strength and Frame Loss Measurements for WLANS," Oct. 2009, 58 pages.

* cited by examiner

TECHNIQUES FOR MANAGING SIFS-BURSTING IN WLAN SYSTEM

BACKGROUND

Field of the Disclosure

The present disclosure, for example, relates to wireless communication systems, and more particularly to closed-loop power control.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems. A wireless network, for example a Wireless Local Area Network (WLAN), such as a Wi-Fi network (IEEE 802.11) may include an access point (AP) that may communicate with stations (STAs) or mobile devices, otherwise known as user equipments (UEs). The AP may be coupled to a network, such as the Internet, and may enable a mobile device to communicate via the network (and/or communicate with other devices coupled to the access point).

Some WLAN systems use carrier sense multiple access (CSMA) to share a wireless medium between multiple nodes in a basic service set (BSS). CSMA is a media access control (MAC) protocol in which an AP or wireless station verifies the absence of other traffic on a shared transmission medium before transmitting over the medium. Typically, in a Wi-Fi network, a wireless station that wishes to transmit over the medium performs a clear channel assessment (CCA) to determine whether the medium is idle for a fixed period before transmitting. The fixed period may be a distributed coordinate function (DCF) interframe space (DIFS). If a wireless station determines that the medium is idle (i.e., free) for a time period specified by the DIFS, the wireless station may transmit a first data packet. After waiting for another DIFS, the wireless station may transmit a second data packet if no other traffic occurred on the medium during the DIFS.

A short interframe space (SIFS) burst is a technique that a node may employ to bypass the requirement to have a DIFS between transmitting data packets or any other technique employing an interframe space (IFS) such as point coordination function (PCF) interframe space (PIFS) to maintain control of a channel and prevent other stations from contending for the medium. During a SIFS burst, a wireless station may transmit a series of data packets in close succession. Instead of the data packets being separated by a DIFS, in a SIFS burst the data packets are separated by a SIFS. The SIFS is typically shorter than the DIFS. During a SIFS burst, another node in the BSS has no opportunity to use the wireless medium because a node cannot begin to transmit over the medium until the medium has been quiet for at least the DIFS.

Power control during a SIFS burst has been limited. Open-loop power control techniques are used for Wi-Fi systems, but are inadequate during a SIFS burst. A communication system using an open-loop power control technique may attempt to progressively reduce a power amplifier bias when operating at the highest modulation and coding scheme (MCS) and when a packet error rate (PER) is less than a predetermined threshold. However, these techniques may miscalculate a link budget because the calculations are based on indirect metrics, such as the PER. These open-loop techniques may also be reactive in nature, which may result in PER jumps before recovery actions may be taken to restore power to the transmission. Using these open-loop power control techniques for a SIFS burst may lead to disruption of a SIFS burst due to packet failures. Further, these open-loop power control techniques are often only implemented when the MCS reaches a ceiling.

SUMMARY

Closed-loop power control techniques may be implemented during a short interframe space (SIFS) burst. The power control techniques provide feedback for a node to adjust the transmit power for subsequent data packets in the SIFS burst. When a node enters a SIFS burst mode, the power control technique may be enabled. The node may transmit a first data packet in the SIFS burst. Responsive to receiving the first data packet, the receiving node may determine an appropriate power level for a next transmission and send feedback for a power level adjustment encoded in an acknowledgement (ACK). The node may determine the power control feedback from the ACK and adjust a power level for transmission of the second data packet based at least in part on the feedback. The node may continue to receive feedback for each transmitted data packet and adjust the power level for the subsequent data packet.

According to a first set of illustrative examples, a method for wireless communication may include receiving feedback associated with transmit power used to transmit a first data packet in a SIFS burst; and adjusting at least the transmit power, or a modulation and coding scheme (MCS), or a combination thereof, used to transmit a second data packet of the SIFS burst based at least in part on the received feedback. The method may also include transmitting the second data packet in the SIFS burst using the adjusted transmit power or the adjusted MCS.

In some examples, the method may further include receiving feedback associated with transmit power used to transmit the second data packet in the SIFS burst; and adjusting at least a transmit power, or a MCS, or a combination thereof for a third data packet of the SIFS burst based at least in part on the received feedback associated with the transmit power used to transmit the second data packet.

Receiving the feedback may include receiving an ACK or Block-ACK for the first data packet; and identifying a step size for a transmit power adjustment from a header frame of the ACK or Block-ACK. Adjusting the transmit power may include adjusting the transmit power based at least in part on the identified step size. In certain examples, the method may further include identifying a plurality of bits in the header frame that correspond to one of a plurality of power adjustments, where identifying the step size may include determining that the step size maps to a next MCS level; and changing the MCS to the next MCS level to transmit the second data packet.

In some examples, the method may further include exchanging a bitmap during an initial setup phase, the bitmap indicating a plurality of bits in a header frame to use to indicate one of a plurality of power adjustments. In other examples, the method may further include determining that a wireless device is operating in a SIFS burst mode; and enabling a transmit power control based at least in part on the occurrence of a condition while operating in the SIFS burst mode. The occurrence of the condition may include at least an average beacon received signal strength indication (RSSI) of at least the first data packet is greater than or equal to an RSSI threshold, or a range of the first wireless device to a second wireless device being within a threshold distance, or a protocol frame exchange triggered by the first wireless device, or a combination thereof.

According to a second set of illustrative examples, an apparatus for wireless communication may include a feedback component to receive feedback associated with transmit power used to transmit a first data packet in a SIFS burst; and an adjustment component to adjust at least the transmit power, or a MCS, or a combination thereof, used to transmit a second data packet of the SIFS burst based at least in part on the received feedback. The apparatus may further include a transmitter may be further to transmit the second data packet in the SIFS burst using the adjusted transmit power or the adjusted MCS.

In some examples, the feedback component may receive feedback associated with transmit power used to transmit the second data packet in the SIFS burst, and the adjustment component may adjust at least a transmit power, or a MCS, or a combination thereof for a third data packet of the SIFS burst based at least in part on the received feedback associated with the transmit power used to transmit the second data packet.

The feedback component may further receive an ACK or Block-ACK for the first data packet and identify a step size for a transmit power adjustment from a header frame of the ACK or Block-ACK, where the adjustment component may further adjust the transmit power based at least in part on the identified step size. In certain examples, the feedback component may further identify a plurality of bits in the header frame that correspond to one of a plurality of power adjustments, where the feedback component may determine that the step size maps to a next MCS level, and the adjustment component may further change the MCS to the next MCS level to transmit the second data packet.

In some examples, the apparatus may further include a SIFS power control enabler to exchange a bitmap during an initial setup phase, the bitmap indicating a plurality of bits in a header frame to use to indicate one of a plurality of power adjustments. In other examples, the apparatus may further include a SIFS burst mode manager to determine that a wireless device is operating in a SIFS burst mode and to enable a transmit power control based at least in part on the occurrence of a condition while operating in the SIFS burst mode. The occurrence of the condition may include at least an average beacon RSSI of at least the first data packet is greater than or equal to an RSSI threshold, or a range of the first wireless device to a second wireless device being within a threshold distance, or a protocol frame exchange triggered by the first wireless device, or a combination thereof.

According to a third set of illustrative examples, an apparatus for wireless communication may include means for receiving feedback associated with transmit power used to transmit a first data packet in a SIFS burst; and means for adjusting at least the transmit power, or an MCS, or a combination thereof, used to transmit a second data packet of the SIFS burst based at least in part on the received feedback. The apparatus may also include means for transmitting the second data packet in the SIFS burst using the adjusted transmit power or the adjusted MCS.

The means for receiving feedback may include means for receiving an ACK or Block-ACK for the first data packet; and means for identifying a step size for a transmit power adjustment from a header frame of the ACK or Block-ACK. In some examples, the means for receiving feedback may further include means for identifying a plurality of bits in the header frame that correspond to one of a plurality of power adjustments; and means for adjusting the transmit power based at least in part on the identified step size.

In some examples, the apparatus may further include means for exchanging a bitmap during an initial setup phase, the bitmap indicating a plurality of bits in a header frame to use to indicate one of a plurality of power adjustments. In other examples, the apparatus may further include means for determining that a wireless device is operating in a SIFS burst mode and to enable a transmit power control based at least in part on the occurrence of a condition while operating in the SIFS burst mode. The occurrence of the condition may include at least an average beacon RSSI of at least the first data packet is greater than or equal to an RSSI threshold, or a range of the first wireless device to a second wireless device being within a threshold distance, or a protocol frame exchange triggered by the first wireless device, or a combination thereof.

According to a fourth set of illustrative examples, a non-transitory computer-readable medium storing computer-executable code for wireless communication may include code executable by a processor to cause a wireless communication apparatus to perform a fine timing measurement procedure with a wireless device to receive feedback associated with transmit power used to transmit a first data packet in a SIFS burst; and adjust at least the transmit power, or an MCS, or a combination thereof, used to transmit a second data packet of the SIFS burst based at least in part on the received feedback. The code may further executable by the processor to transmit the second data packet in the SIFS burst using the adjusted transmit power or the adjusted MCS.

The code may be further executable by the processor to receive an ACK or Block-ACK for the first data packet; and identify a step size for a transmit power adjustment from a header frame of the ACK or Block-ACK, where the code being further executable by the processor to identify a plurality of bits in the header frame that correspond to one of a plurality of power adjustments; and adjust the transmit power based at least in part on the identified step size.

In some examples, the non-transitory computer-medium may further include code executable by the processor to exchange a bitmap during an initial setup phase, the bitmap indicating a plurality of bits in a header frame to use to indicate one of a plurality of power adjustments. In other examples, the code may be further executable by the processor to determine that a wireless device is operating in a SIFS burst mode and to enable a transmit power control based at least in part on the occurrence of a condition while operating in the SIFS burst mode. The occurrence of the condition may include at least an average beacon RSSI of at least the first data packet is greater than or equal to an RSSI threshold, or a range of the first wireless device to a second wireless device being within a threshold distance, or a protocol frame exchange triggered by the first wireless device, or a combination thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In wireless local area network (WLAN) systems, power consumption may be improved in an uplink (e.g., transmission) performance mode. A node transmitting in a short interframe space (SIFS) burst mode may receive feedback on power control for the data packets in the SIFS burst. The feedback may improve power consumption at the node and enable the node to achieve high performance at reduced power levels, and/or alleviate exposed node problems, and/or optimize the amount of collisions in an inter- or intra-basic service set (BSS). The SIFS burst may optimize spatial utilization of a channel across overlapping BSSs, and based on the data delivery requested by a node generating the transmitted data packets, the node may make decisions for optimizing quality of service requested by an application on the node.

The feedback received at the node may indicate an adjustment to a transmit power level (e.g., an increase or a decrease from a previous level) or may indicate a change in a modulation and coding scheme (MCS). The feedback (also referred to herein as power guidance) may be encoded in an acknowledgement (ACK) or block-acknowledgement (BACK) message in response to the transmitted SIFS burst data packet. The node may interpret the feedback and adjust either the transmit power level or the MCS. In some examples, the node may choose to combine the power guidance with local information available at the node about the nature and quality of service requested by the application on the node generating the data packets to optimize power consumption, reliability, overall network throughput, and/or throughput observed by the application on the node. Certain metrics may be used to qualify the application and the extent of application of the power guidance based on local information available at the node (via sensors), such as motion, distance, acceleration, etc. for example.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
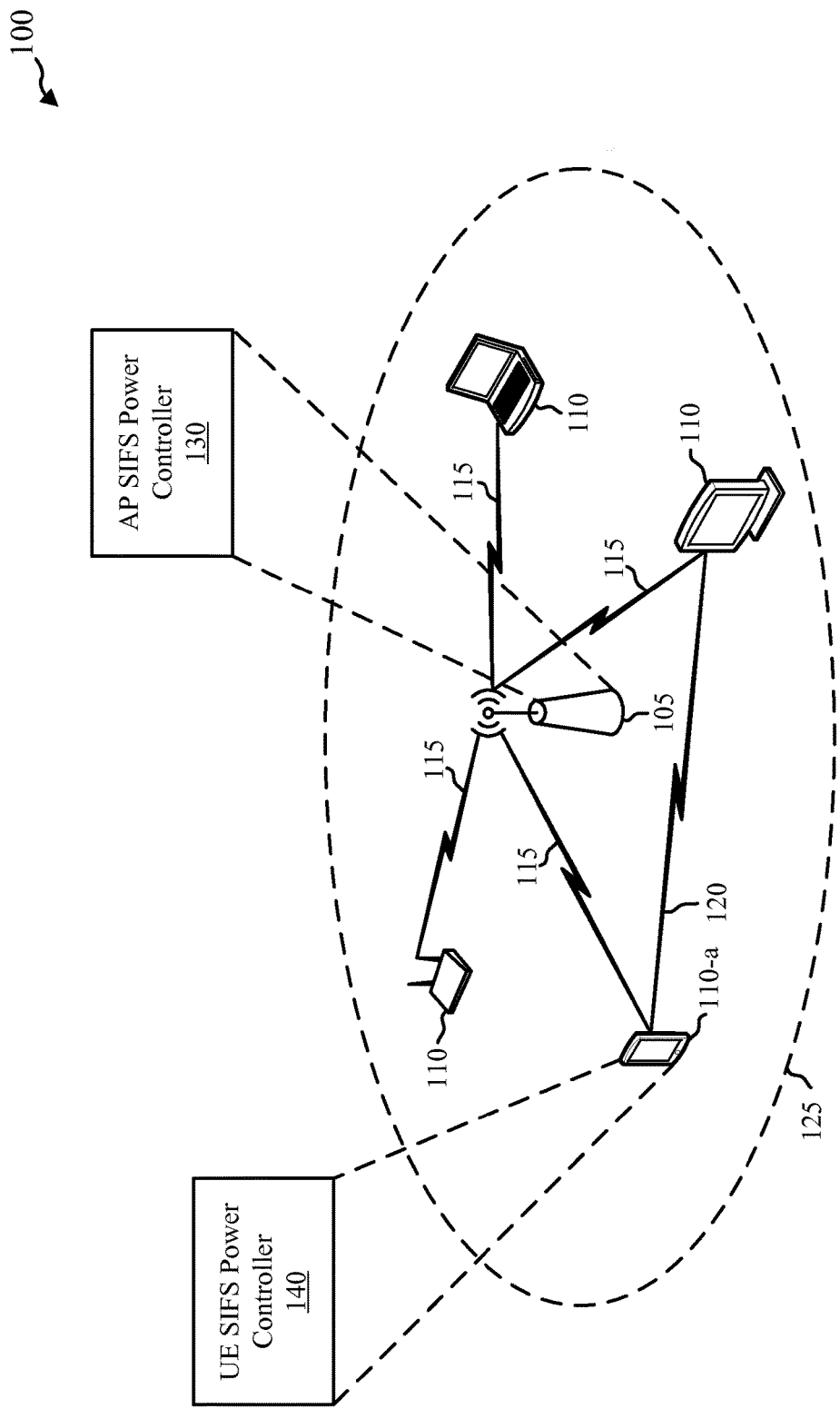
FIG. 1 shows a diagram of a wireless communication system, in accordance with various aspects of the present disclosure.

Referring first to FIG. 1, a block diagram illustrates an example of a wireless communication system 100 such as, e.g., a network implementing at least one of the IEEE 802.11 family of standards (e.g., a WLAN network), in accordance with various aspects of the present disclosure. The wireless communication system 100 may include an access point (AP) 105 and wireless devices or stations (STAs) 110, such as mobile stations, personal digital assistants (PDAs), other handheld devices, netbooks, notebook computers, tablet computers, laptops, display devices (e.g., TVs, computer monitors, etc.), printers, and the like. While only one AP 105 is illustrated in FIG. 1, the wireless communication system 100 may have multiple APs 105. Each of the wireless devices 110, which may also be referred to as mobile stations (MSs), mobile devices, access terminals (ATs), user equipment (UE), subscriber stations (SSs), or subscriber units, may associate and communicate with an AP 105 via a communication link 115. Each AP 105 has a geographic coverage area 125 such that wireless devices 110 within that area can typically communicate with the AP 105. The wireless devices 110 may be dispersed throughout the geographic coverage area 125. Each wireless device 110 may be stationary or mobile.

A single AP 105 and an associated set of stations may be referred to as a basic service set (BSS). An extended service set (ESS) can be a set of connected BSSs. A distribution system (DS) can be used to connect APs 105 in an ESS. A geographic coverage area 125 for an access point 105 may be divided into sectors making up only a portion of the coverage area. The wireless communication system 100 may include access points 105 of different types (e.g., metropolitan area, home network, etc.), with varying sizes of coverage areas and overlapping coverage areas for different technologies. Other wireless devices besides the wireless devices 110 can communicate with the AP 105. Further, a wireless device 110 can be covered by more than one AP 105 and can therefore associate with at least one AP 105 at different times. Some of the wireless devices 110 may also communicate with other network devices in addition to the AP 105. For example, a wireless device 110 may communicate with another type of network device (e.g., a base station) using a different radio access technology (e.g., Long-Term Evolution (LTE)).

While the wireless devices 110 may communicate with each other through the AP 105 using the communication links 115, each wireless device 110 may also communicate directly with other wireless devices 110 via a direct wireless link 120. Two or more wireless devices 110 may communicate via a direct wireless link 120 when both wireless devices 110 are in the AP geographic coverage area 125 or when one or neither wireless device 110 is within the AP geographic coverage area 125. Examples of direct wireless links 120 may include Wi-Fi Direct connections, connections established by using a Wi-Fi Tunneled Direct Link Setup (TDLS) link, and other P2P group connections. The wireless devices 110 in these examples may communicate according to the WLAN radio and baseband protocol including physical and media access control (MAC) layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within the wireless communication system 100. The described techniques are may apply to any communication mechanism which allows peer-to-peer communication of UE, AP, and Station. Power control algorithms could coexist within the same UE as instances which manage a particular direction of packet flow from the UE or to the UE.

The AP 105 may include an AP SIFS power controller 130. The AP SIFS power controller 130 may provide feedback to a wireless device, such as a wireless device 110-a. The AP 105 may receive a SIFS burst from the wireless device 110-a. Based on at least the reception of the SIFS burst at the AP 105, the AP SIFS power controller 130 may determine power guidance to determine a more appropriate power level or MCS for the wireless device 110-a to send data transmissions. The AP SIFS power controller 130 may generate an acknowledgement (e.g., an ACK or a block acknowledgement (BACK)) and may code the power guidance into bits of the ACK frame. The AP 105 may transmit the ACK frame to the wireless device 110-a in response to receiving the SIFS burst.

The AP SIFS power controller 130 may further augment the information it receives and exchanges the information with the neighboring BSS over the backhaul/DS to optimize overall network throughput. Overlapping BSSs may be able to provide such information by observing packets from neighboring BSS and their signal quality metrics, power levels, perceived effect of packet transmissions in the neighboring BSS on delay and jitter observed by the overlapping BSSs.

In another example, the AP 105 may receive an ACK containing power guidance from another AP in response to a SIFS burst from the AP 105. The AP SIFS power controller 130 may interpret the power guidance in the ACK and adjust a transmit power level or an MCS based on the power guidance for a next transmission from the AP 105.

A wireless device 110-a may include a UE SIFS power controller 140 that can adjust a power level or MCS based on feedback in response to a SIFS burst transmitted by the wireless device 110-a. The UE SIFS power controller 140 may interpret power guidance coded into an ACK message received at the wireless device 110-a for the SIFS burst. Based on the power guidance feedback, the UE SIFS power controller 140 may adjust a transmit power level or an MCS.

The power control features described herein may improve reception of a SIFS burst and power consumption at the device transmitting the SIFS burst. Further, using the closed-loop power control features may ensure that the power guidance is still relevant by the time the transmitting device is prepared to send the next data packet in the SIFS burst. Further, improved calculations of a link budget may be achieved using the power control features. Additionally, less PER jumps may occur before recovery actions are able to be taken because the closed-loop power control may not be reactive in nature. Also the power control features do not require the MCS to reach a ceiling before the features may be used. Adverse impacts to the rate control that may occur in open-loop systems because of estimation errors are reduced. The closed-loop feedback in the power control features may be effective in terms of a response time as compared to open loop feedback, because the closed-loop feedback may show sharp decay with progressing time due to channel coherence and channel variation effects.

Figure 2:
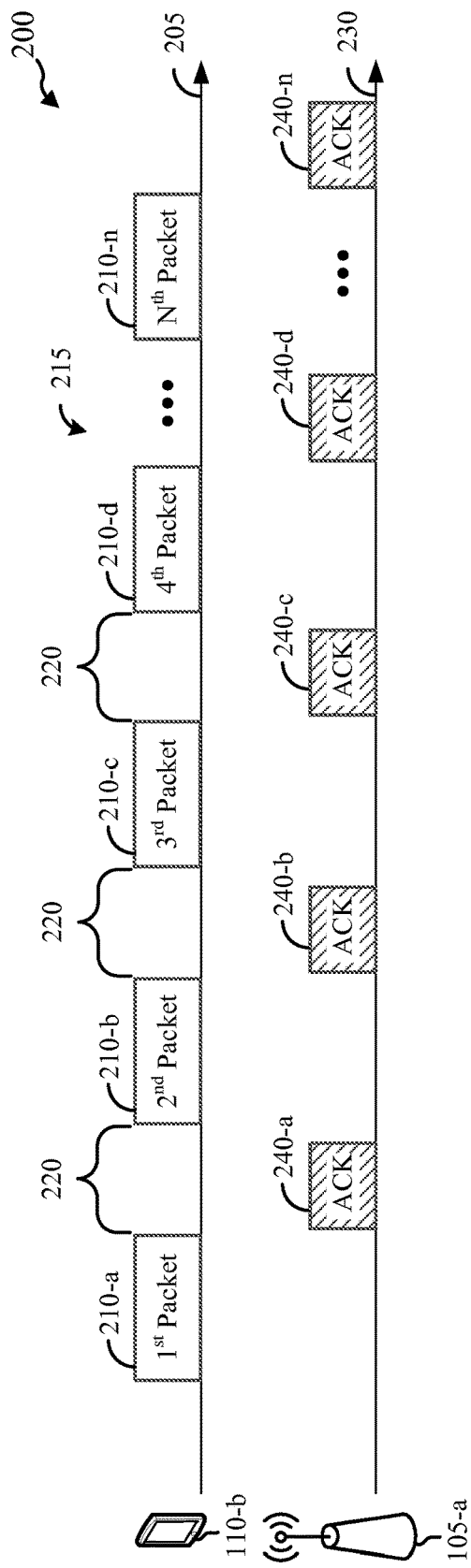
FIG. 2 shows a timing diagram for use in a wireless communication system, in accordance with various aspects of the present disclosure.

FIG. 2 shows a timing diagram 200 for use in a wireless communication system, in accordance with various aspects of the present disclosure. The wireless communication system may be an example of the wireless communication system 100 of FIG. 1. FIG. 2 illustrates timelines for communications between a wireless device 110-b and an AP 105-a over a channel. The wireless device 110-b may be an example of one or more aspects of the wireless devices 110 of FIG. 1. The AP 105-a may be an example of one or more aspects of the AP 105 of FIG. 1.

The wireless device 110-b may transmit data packets according to the example timeline 205. The timeline 205 illustrates SIFS burst transmissions from the wireless device 110-b over a given time period. A timeline 230 may be an example of ACK messages transmitted by the AP 105-a in response to the transmissions from the wireless device 110-b. The timeline 230 may correspond to the same time period as the timeline 205.

The wireless device 110-b may enter a SIFS burst mode and transmit a SIFS burst 215. The SIFS burst 215 may be a series of data packets including a first data packet 210-a, a second data packet 210-b, a third data packet 210-c, a fourth data packet 210-d, and an $n^{th}$ data packet 210-n (collectively referred to as data packets 210) separated by a SIFS duration 220. N may be a positive integer. In some examples, n is 10 or 12, but may be other numbers in other examples. For example, n may be any other inter frame spacing which may be used to maintain access to the channel and prevent other wireless devices, or nodes in a BSS from contending for medium access.

The SIFS duration 220 separating the data packets 210 from each other may be shorter in duration than a DIFS. Another node in a BSS may have to detect no traffic over the channel for at least a DIFS duration before the node may transmit over the channel. Because the SIFS duration 220 is shorter than the DIFS, other nodes will not be able to use the channel until after the SIFS burst 215 is complete.

After successfully receiving a data packet 210, the AP 105-a may transmit an acknowledgement or block acknowledgement. Upon receiving the first data packet 210-a, the AP 105-a transmits an ACK 240-a. Likewise, the AP 105-a transmits an ACK 240-b in response to the second data packet 210-b, an ACK 240-c in response to the third data packet 210-c, an ACK 240-d in response to the fourth packet 210-d, and an ACK 240-n in response to the $n^{th}$ packet 210-n. The ACK messages may be collectively referred to as ACKs 240.

The wireless device 110-b may only transmit a next data packet 210 in the SIFS burst 215 after receiving an ACK 240 in response to receiving the previous data packet 210. That is, if the wireless device 110-b fails to receive an ACK 240 for a data packet 210 from the AP 105-a, the wireless device 110-b may end the SIFS burst. If the wireless device 110-b ends the SIFS burst before all the data packets 210 are transmitted, the wireless device 110-b may take control of the channel after a traffic-free DIFS and send the SIFS burst 215 again.

The AP 105-a may encode power guidance into each ACK 240. The AP 105-a may obtain relevant signal strength information for a data packet 210 and determine a recommended power level adjustment. The AP 105-a may indicate the recommended power level adjustment in an ACK 240.

For example, the wireless device 110-b may transmit the first data packet 210-a over the channel. The AP 105-a may receive the first data packet 210-a. From information related to the reception of the first data packet 210-a, the AP 105-a may determine a signal-to-interference-plus-noise ratio (SINR) or a signal-to-noise ratio (SNR) for the transmission. The AP 105-a may map the SINR/SNR to a minimum SINR/SNR required for robust demodulation of the incoming MCS rate. This mapping provides a link budget which the AP 105-a may map to a power guidance. The AP 105-a may then encode the power guidance (e.g., a next transmit power level or an MCS) into the ACK 240-a. The AP 105-a may encode the power guidance by overloading a number of bits in a header frame-control field of the ACK 240-a.

The wireless device 110-b may receive the ACK 240-a and decode the power guidance. The wireless device 110-b may use the power guidance to adjust a transmit power level or an MCS before transmitting the second data packet 210-b. Once the adjustments have been made, the wireless device 110-b may transmit the second data packet 210-b at the adjusted transmit power level or with the adjusted MCS. The AP 105-a may determine a new power guidance in response to receiving the second data packet 210-b and encode the new power guidance in the ACK 240-b. The wireless device 110-b may extract the new power guidance from the ACK 240-b and make any adjustments for the third data packet 210-c, and so on.

Thus, techniques described herein provide a closed-loop power control for the SIFS burst 215 that enables adaptive transmission power adjustment. In some examples, the transmission power adjustment may be a reduction in transmission power as the wireless device 110-b moves closer to the AP 105-a during the SIFS burst 215 transmission. In other examples, other adjustments of the transmission power may be made for other reasons.

Figure 3:
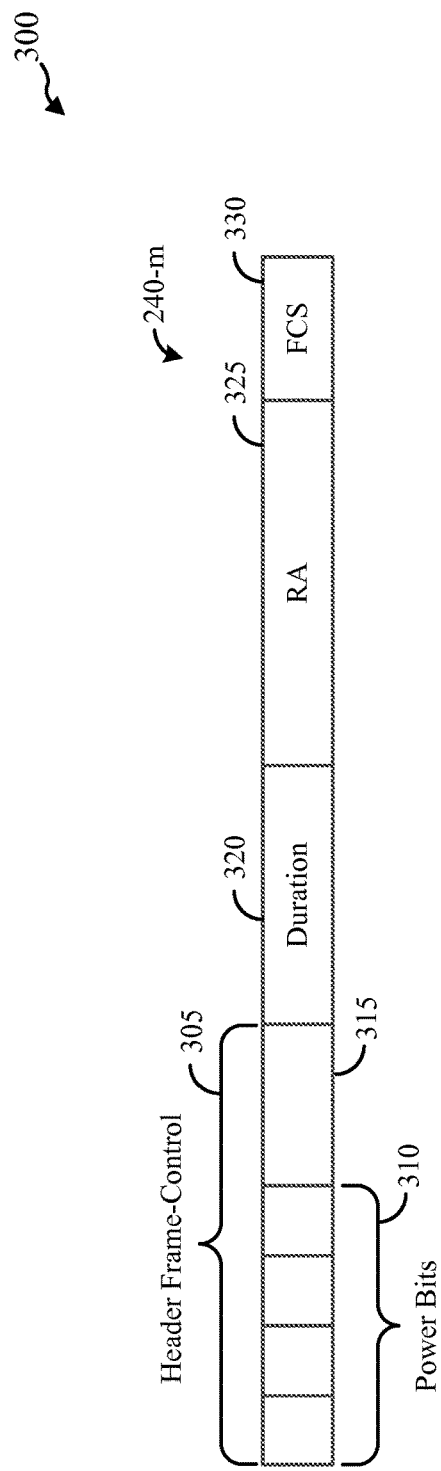
FIG. 3 shows an acknowledgement frame for use in a wireless communication system, in accordance with various aspects of the present disclosure.

FIG. 3 shows an conceptual diagram 300 of an acknowledgement frame (ACK) 240-m for use in a wireless communication system, in accordance with various aspects of the present disclosure. The ACK 240-m may be an example of one or more aspects of an ACK 240 of FIG. 2. The ACK 240-m may be transmitted by a node in a wireless communication system, such as a wireless device 110 or an AP 105 of FIGS. 1 and 2. The ACK 240-m described herein may only be an example and different frames may be used to serve the purpose of reporting successful reception and/or requesting a retransmission.

The ACK 240-m may have four fields, including a header frame-control field 305, a duration field 320, a receiver address (RA) field 325, and a frame check sequence (FCS) field 330. The header frame-control field 305 may include control information for defining the type of MAC frame and providing information for a recipient to understand how to process the frame. The duration field 320 may indicate a remaining duration needed to receive the next frame transmission. The RA field 325 may contain a receiver address. The FCS field 330 may contain a 32-bit cyclic redundancy check (CRC). In other examples, the ACK 240-m may include other types fields or other uses for the fields.

The power bits 310 may be included in the header frame-control field 305. That is, the power bits 310 may be overloaded into the header frame-control field 305. A portion 315 of the header frame-control field 305 may be unaffected by the power bits 310. Example fields in the header frame-control field 305 that may be used for the power bits 310 include a FromDS field, a ToDS field, a more fragments (MoreFrag) field, and an Order field. In other examples, different fields may be used, such as a protocol version field, a type field, a subtype field, a retry field, a power management field, a more data field, a protected frame field, and combinations thereof. Although the specific example in FIG. 3 shows the power bits 310 in the beginning of the header frame-control field 305 for illustrative purposes, the power bits 310 may be located anywhere within the header frame-control field 305. Alternatively, the power bits 310 may be added into any future extension of a frame which reports successful data delivery and/or requests retransmission.

The power bits 310 may identify the power guidance recommended for a next data packet transmission. In one example, the power bits 310 may include four bits. The four bits may be used to indicate a number of different power adjustments in pre-determined step sizes. In one example, the pre-determined step sizes may be 0.25, 0.5, and 1 decibels (dB). Table 1 gives one example of how four bits may be used to indicate a power adjustment.

TABLE 1

| Bit 1 | Bit 2 | Bit 3 | Bit 4 | Power Adjustment |
|-------|-------|-------|-------|------------------|
| + | 0 | 0 | 0 | No change |
| + | 0 | 0 | 1 | +0.25 |
| + | 0 | 1 | 0 | +0.5 |
| + | 0 | 1 | 1 | +0.75 |
| + | 1 | 0 | 0 | +1 |
| + | 1 | 0 | 1 | +1.25 |
| + | 1 | 1 | 0 | +1.50 |
| + | 1 | 1 | 1 | +1.75 |

TABLE 1-continued

| Bit 1 | Bit 2 | Bit 3 | Bit 4 | Power Adjustment |
|---|---|---|---|---|
| – | 0 | 0 | 0 | No change |
| – | 0 | 0 | 1 | −0.25 |
| – | 0 | 1 | 0 | −0.5 |
| – | 0 | 1 | 1 | −0.75 |
| – | 1 | 0 | 0 | −1 |
| – | 1 | 0 | 1 | −1.25 |
| – | 1 | 1 | 0 | −1.50 |
| – | 1 | 1 | 1 | −1.75 |

As shown in Table 1, a bit 1 may be used to designate a direction of the power adjustment (e.g., increase power for the next transmission or decrease power for the next transmission). A bit 2 may be used for changing 1 dB, a bit 3 may be used for changing 0.5 dB, and a bit 4 may be used for changing 0.25 dB. However, in other examples, other numbers of bits may be used. Additionally, different dB values may be assigned to the bits. In some examples, a wireless device or an AP may exchange a bitmap during an initial setup before a SIFS burst. The bitmap may identify the number of bits used, where the bits will be overloaded in the ACK 240-m, and how to interpret the bits.

Figure 4:
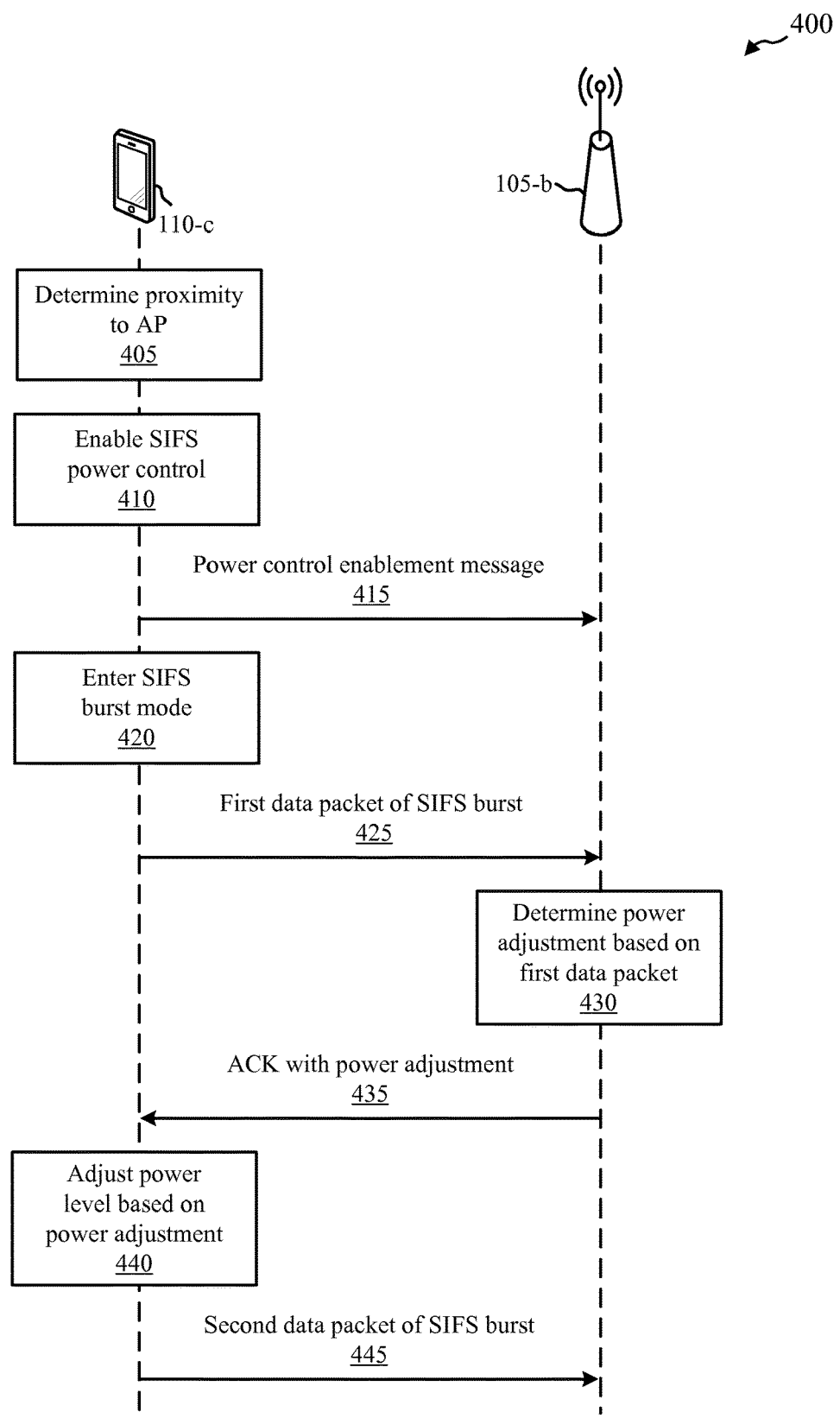
FIG. 4 is a flow diagram illustrating a process of power level adjustment in a wireless network, in accordance with various aspects of the present disclosure.

FIG. 4 is a flow diagram illustrating a process 400 of power level adjustment in a wireless network, in accordance with various aspects of the present disclosure. The diagram includes a wireless device 110-c and an AP 105-b. The wireless device 110-c may be an example of aspects of the wireless devices 110 of FIGS. 1 and 2. The AP 105-b may be an example of aspects of the AP 105 described with reference to FIGS. 1 and 2.

The wireless device 110-c may have a SIFS burst closed-loop power control feature. The process 400 may occur at a time that the wireless device 110-c wants to send a SIFS burst. The wireless device 110-c may have determined that a communication channel to transmit to the AP 105-b is clear. At block 405, the wireless device 110-c may determine a proximity of the wireless device 110-c to the AP 105-b. The wireless device 110-c may determine the proximity to the AP 105-b using an average beacon received signal strength indication (RSSI), average_bcn_rssi, as a coarse indicator of range to the AP 105-b. In this example, the wireless device 110-c may only trigger the SIFS power control when the average_bcn_rssi is greater than, or greater than or equal to, a pre-configured RSSI threshold. The pre-configured RSSI threshold may relate to a proximity of the wireless device 110-c to the AP 105-b. The wireless device 110-c may enable the SIFS power control if the average_bcn_rssi is greater than the pre-configured RSSI threshold at block 410.

The wireless device 110-c may wish to inform the AP 105-b that the SIFS power control has been enabled. If so, the wireless device 110-c may send a power control enablement message 415 to the AP 105-b. The AP 105-b may receive the power control enablement message 415 and may know to encode power guidance into ACK or BACK messages. In some examples, the wireless device 110-c may inform the AP 105-b that the SIFS power control has been enabled at an earlier time, such as during an initial setup.

The wireless device 110-c may enter a SIFS burst mode at block 420. In the SIFS burst mode, the wireless device 110-c may transmit a SIFS burst to the AP 105-b after determining the channel is clear. In the SIFS burst, the wireless device 110-c may transmit consecutive data packets with only a SIFS separating the data packets. The SIFS burst may include any number of data packets, such as 8, 10, 12, or some other number. FIG. 4 illustrates closed-loop power control for two data packets. The process 400 may be repeated for all or a subset of the data packets in the SIFS burst.

The wireless device 110-c may send a first data packet 425 of the SIFS burst to the AP 105-b. From conditions of the transmission of the first data packet, the AP 105-b may determine a power adjustment for a second data packet at block 430. In various example, the AP 105-b may determine the power adjustment based on an RSSI of the first data packet 425, an MCS of the first data packet 425, other metrics, or a combination thereof. Other metrics the AP 105-b may use to determine the power adjustment may include a long term history of failures (e.g., observed past failures), fluctuations in RSSI/SNR, an amount of multi-paths, forward error correction (FEC) performed on a received frame (some form of confidence metric from the decoder), direct/indirect ranging, an estimation of change in distance, and/or fluctuations in distance (e.g., an indicator of UE/AP mobility), etc.

The AP 105-b may determine the power adjustment for the second data packet based on a link budget. A link budget may be an accounting of all gains and losses from a transmitter of the wireless device 110-c through the medium to the AP 105-b. The link budget may be represented as a received power being equal to a transmitted power plus the gains minus the losses.

Once the power adjustment is determined, the AP 105-b may generate an ACK or BACK that identifies the power adjustment. That is, the AP 105-b may create an ACK with 4 bits that identify what the power adjustment should be for the next data packet in the SIFS burst. The AP 105-b may transmit the ACK 435 with the power adjustment to the wireless device 110-c.

The wireless device 110-c may identify the power adjustment from the ACK 435. The power adjustment may be relative to the previous power level used to transmit the first data packet 425. When the power adjustment is relative, the wireless device 110-c may make a change from the previous power level based on the relative amount. In other examples, the power adjustment may be an absolute power level. That is, the power adjustment may identify a specific power level for the wireless device 110-c to use for the next data packet regardless of the previous power level.

The wireless device 110-c may adjust the transmit power level based on the power adjustment for the second data packet at block 440. If the power adjustment indicates to adjust the transmit power level by 0.75 dB, for example, the wireless device 110-c may increase the transmit power by 0.75 dB. The wireless device 110-c may transmit the second data packet of the SIFS burst at the adjusted power level. Alternatively, the wireless device 110-c may choose to partially apply the power guidance based at least in part on a multitude of sensors, a movement and/or a gamut of other local information about changes in parameters which may invalidate the power guidance or require the wireless device 110-c to operate in a conservative mode, depending on its local decision and/or policy about the purpose and subject of parameters that the wireless device 110-c wishes to optimize.

The process 400 may continue in providing power control feedback for some or the rest of the data packets in the SIFS burst. The determination of the power guidance, the generation of the ACK with the power guidance, the transmission of the ACK, the interpretation of the power guidance within the ACK, and the power level adjustment may all occur within a single SIFS duration.

Figure 5:
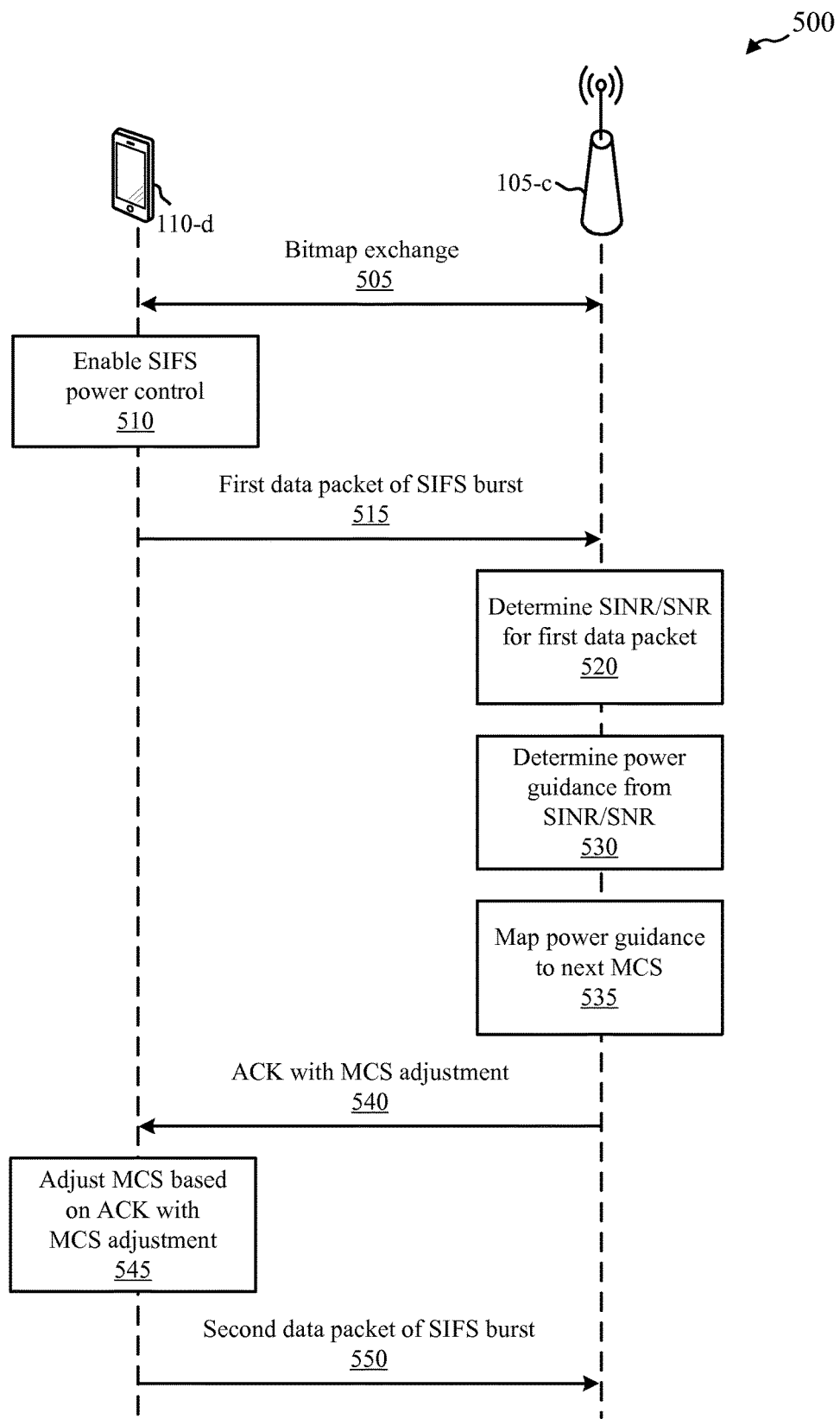
FIG. 5 is a flow diagram illustrating a process of modulation and coding scheme (MCS) adjustment in a wireless network, in accordance with various aspects of the present disclosure.

FIG. 5 is a flow diagram illustrating a process 500 of MCS adjustment in a wireless network, in accordance with various aspects of the present disclosure. The diagram includes a wireless device 110-d and an AP 105-c. The wireless device 110-d may be an example of aspects of the wireless devices 110 of FIGS. 1, 2, and 4. The AP 105-c may be an example of aspects of the AP 105 described with reference to FIGS. 1, 2, and 4. FIG. 5 illustrates an example where the SIFS power control is used to accelerate an MCS ramp-up during a SIFS burst.

The wireless device 110-d may choose to increase the MCS of the next data packet instead of changing the power level if, for example, the power adjustment guidance is large enough to map into the next MCS level. This would increase the MCS sooner than having to wait for a traditional rate control mechanism. In this case, the wireless device 110-d trades higher power for a higher data rate and a lower air-time. This example may be classified under a closed-loop fast rate control during a SIFS burst.

The wireless device 110-d and the AP 105-c may have a SIFS burst closed-loop power control feature. The wireless device 110-d and the AP 105-c may perform an initial bitmap exchange 505. The initial bitmap exchange 505 may indicate which bits of a control frame header of an ACK or BACK are to be overloaded via a bitmap. The initial bitmap exchange 505 may be performed in an initial setup phase. In other examples, the initial bitmap exchange 505 may occur before a SIFS burst.

The wireless device 110-d may enable the SIFS power control and enter a SIFS burst mode at block 510. In one example, the wireless device 110-d may enable the SIFS power control on the occurrence of a condition. The condition may be one of an average_bcn_rssi of at least the first data packet is greater than or equal to a received signal strength indication (RSSI) threshold, a range of the first wireless device to second wireless device being within a threshold distance, a protocol frame exchange triggered by the first wireless device, or combinations thereof.

Once the wireless device 110-d obtains a transmit opportunity, the wireless device 110-d may transmit a first data packet 515 of the SIFS burst at a first transmit power level with a first MCS. From a link budget for the transmission of the first data packet 515, the AP 105-c may determine an SINR/SNR for the first data packet at block 520. The AP 105-c may determine a power adjustment guidance from the SINR/SNR at block 530. If the power adjustment is large enough, it may map to a next MCS level. The next MCS level may be one MCS level higher than the first level. The AP 105-c may then map the power guidance, or the SINR/SNR directly, to the next MCS rate at block 535.

The AP 105-c may encode the MCS adjustment into an ACK and transmit the ACK with the MCS adjustment 540 to the wireless device 110-d. Upon receiving the ACK with the MCS adjustment 540, the wireless device 110-d may adjust the MCS for the next data packet based on the MCS adjustment at block 545. For example, the wireless device 110-d may adjust the first MCS to a second MCS, wherein the second MCS is one higher than the first MCS. The wireless device 110-d may transmit the second data packet 550 using the second MCS.

The process 500 may continue in providing power control feedback for some or the rest of the data packets in the SIFS burst. The AP 105-c may continue to suggest a higher MCS level for the wireless device 110-d as long as the SINR/SNR maps to at least a minimum level for the MCS and until a ceiling of the MCS is reached.

In the process 500, the power control may be made at any arbitrary MCS level. By doing a closed-loop power control, most possible estimation errors (as exemplified in open-loop algorithms) may be ruled out and the guidance may be generally assured to be accurate as it is based on the actual channel environment. Further, the power control as described herein may use SIFS bursting as a performance enhancing mode because it introduces an improved power angle and can display a power ramp-down progressively in a series of composite SIFS bursts, i.e., successful or unsuccessful SIFS bursts or a sequence of the SIFS bursts separated by acknowledgement (e.g., an ACK 240 of FIG. 2). A series of composite SIFS bursts may be 8 to 12 SIFS bursts, for example. A probability of reception of the next set of SIFS burst sequence may be increased by performing a quick ramp-down or by means of measured SNR at the AP 105-c. The wireless device 110-d can choose the optimal MCS based on the received power guidance and its estimate of link budget derived from the feedback provided by AP.

Figure 6:
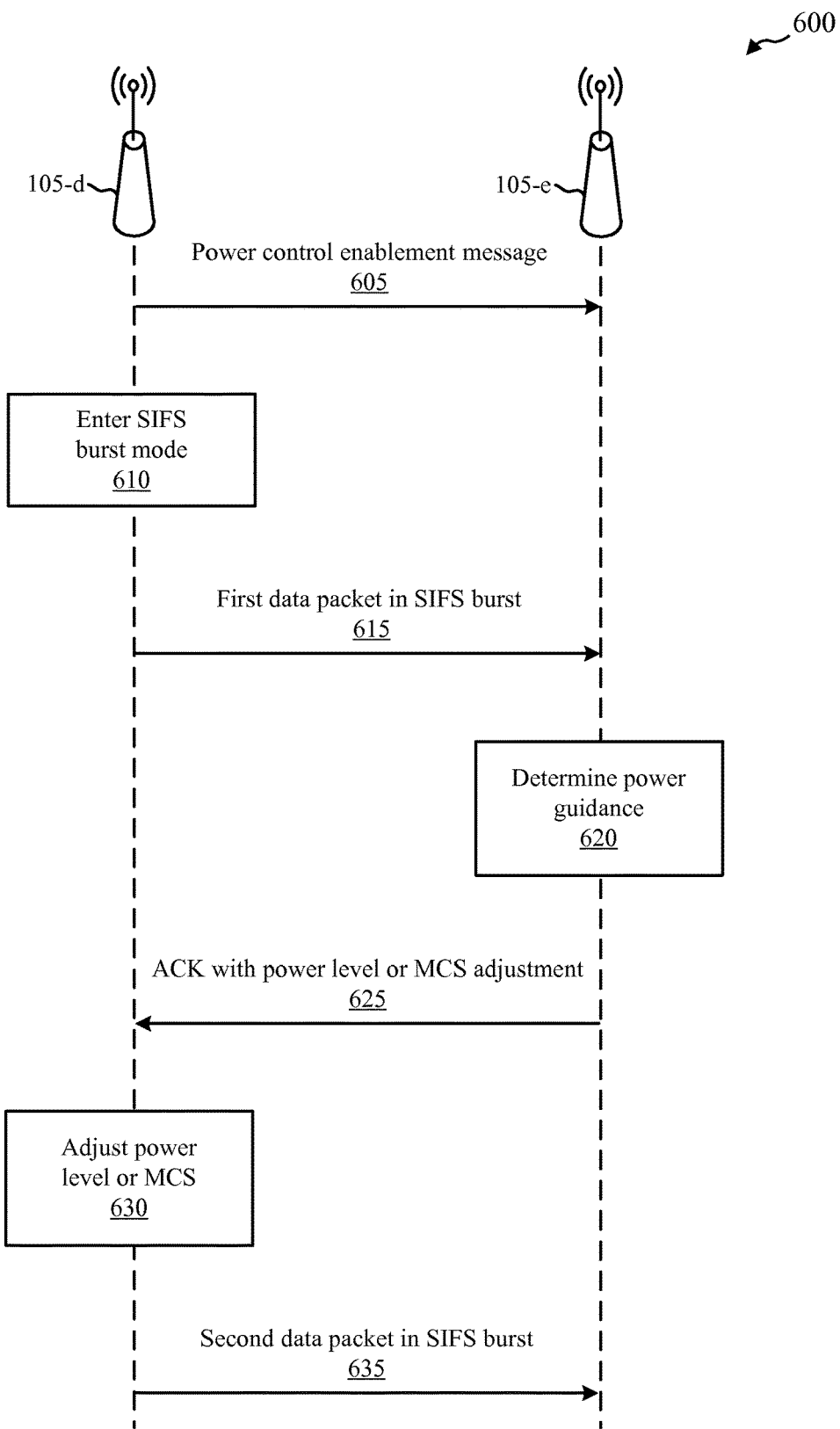
FIG. 6 is a flow diagram illustrating another process of power level or MCS adjustment in a wireless network, in accordance with various aspects of the present disclosure.

FIG. 6 is a flow diagram illustrating another process 600 of power level or MCS adjustment in a wireless network, in accordance with various aspects of the present disclosure. In this example, power control during a SIFS burst occurs between two APs, an AP 105-d and an AP 105-e. The AP 105-d and the AP 105-e may be an example of aspects of the AP 105 described with reference to FIGS. 1, 2, 4, and 5.

The AP 105-d may wish to inform the AP 105-e that the AP 105-d has enabled the SIFS power control. If so, the AP 105-d may send a power control enablement message 605 to the AP 105-e. In another example, the AP 105-e sends the power control enablement message 605 to the AP 105-d. However, in the example of FIG. 5, the AP 105-e may receive the power control enablement message 605 and thus knows to encode power guidance into ACK or BACK messages in response to SIFS burst data packets.

At block 610, the AP 105-d enters the SIFS burst mode. Once in the SIFS burst mode, the AP 105-d transmits a first data packet 615 at a first power level with a first MCS. Based on the transmission and budget link, the AP 105-e may determine a power guidance for a next data packet in the SIFS burst at block 620. The AP 105-e may check whether the power guidance maps to a next MCS. If the power guidance does not map to the next MCS, the AP 105-e may encode a power level adjustment in the ACK/BACK to the first data packet. On the other hand, if the power guidance does map to the next MCS, the AP 105-e may encode an indication to increase the MCS in the ACK/BACK to the first data packet. In some examples, the AP 105-e may encode the power level adjustment in the ACK/BACK but also indicates that an adjacent MCS may be used instead of changing the power level. The AP 105-e transmits the ACK 625 with the power level or MCS adjustment to the AP 105-d.

The AP 105-d may interpret the power level or MCS adjustment from the ACK 625. If the ACK 625 indicates a power level adjustment, the AP 105-d may adjust the power level based on the power guidance in the ACK 625 at block 630. If the ACK 625 indicates an MCS adjustment, the AP 105-d may adjust the MCS at block 630. Alternatively, if the ACK 625 indicates a power level adjustment or an MCS adjustment, the AP 105-d may choose whether to adjust the power level or change the MCS at block 630.

Regardless of whether the AP 105-d adjusts the transmit power level or the MCS, the AP 105-d may transmit a second data packet 635 in the SIFS burst. The second data packet 635 may be transmitted with a second power level that is different from the first power level by an amount identified by the power guidance or may be transmitted with the first power level and a second MCS. The process 600 may continue in providing power control feedback for some or the rest of the data packets in the SIFS burst.

Figure 7:
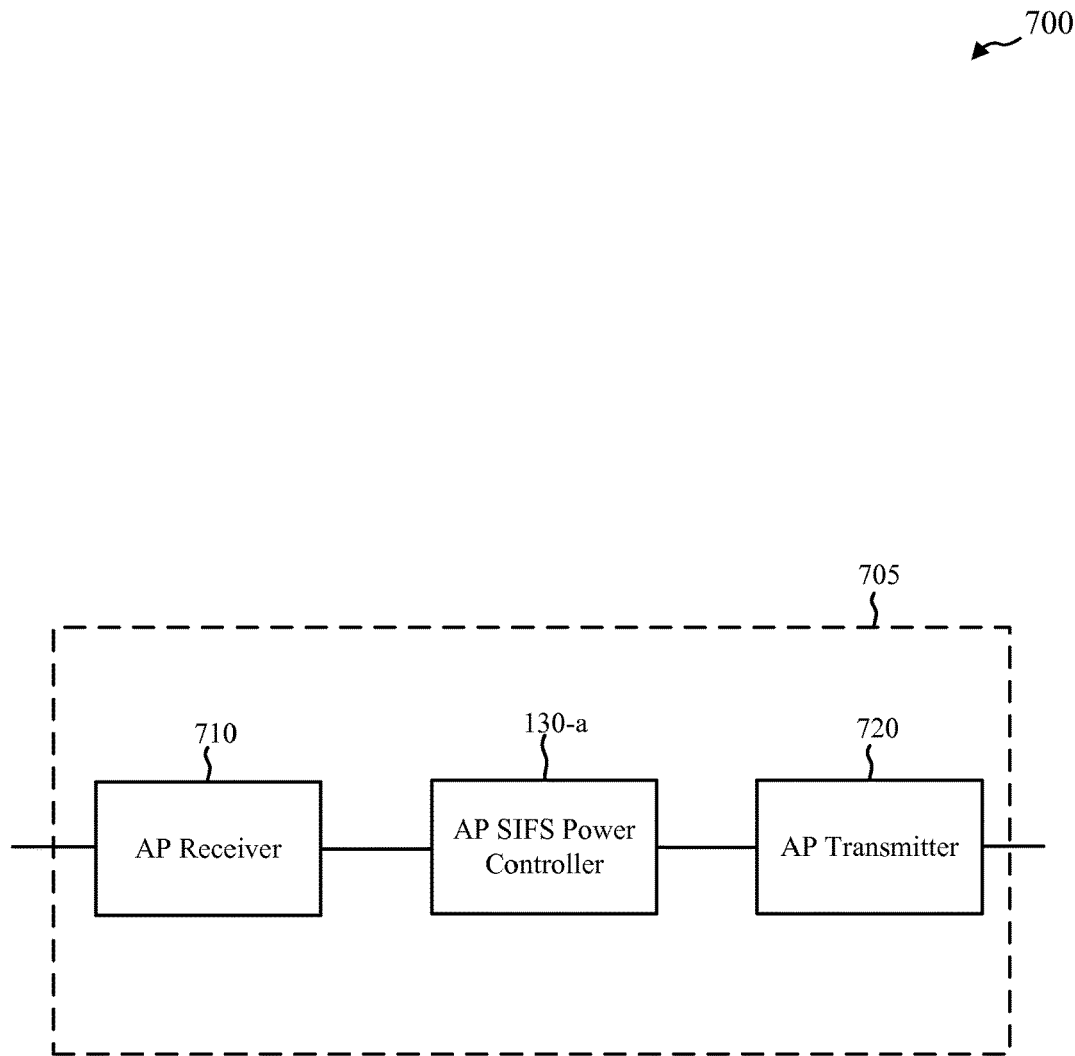
FIG. 7 shows a block diagram of a device for use in wireless communication, in accordance with various aspects of the present disclosure.

FIG. 7 shows a block diagram 700 of a device 705 for use in an AP for wireless communication, in accordance with various aspects of the present disclosure. The device 705 may be an example of aspects of an AP 105 described with reference to FIGS. 1, 2, and 4-6. The device 705 may include a AP receiver 710, an AP SIFS power controller 130-a, and/or a AP transmitter 720. The device 705 may also be or include a processor. Each of these components may be in communication with each other.

The device 705, through the AP receiver 710, the AP SIFS power controller 130-a, or the AP transmitter 720, may perform functions described herein. For example, the device 705 may provide closed-loop power control to a transmitting node or to implement power guidance during a SIFS burst that the device 705 transmits. AP may share statistics about each of UEs (e.g., wireless devices) with a network controller in a network or a nearby BSS. These statistics can further be employed to optimize network performance based on optimizing a transmit power, an MCS within each of the networks, or higher layer algorithms to learn about the specifics of a network where a BSS is operating and the specific behavior of UE's in such an environment.

The AP receiver 710 may receive information such as packets, user data, or control information associated with various information channels (e.g., control channels, data channels, etc.). The AP receiver 710 may receive WLAN transmissions from a wireless device or another AP. The transmissions may include SIFS power control enablement messages, bitmap exchanges, SIFS bursts, or power guidance within an ACK/BACK. Information may be passed on from the AP receiver 710 to the AP SIFS power controller 130-a and to other components of the device 705.

In one example, the AP SIFS power controller 130-a may receive a SIFS power control enablement message from the AP receiver 710. The AP SIFS power controller 130-a may enable its own power control in response. The AP receiver 710 may forward a first data packet of a SIFS burst from a transmitting node to the AP SIFS power controller 130-a. The AP SIFS power controller 130-a may determine a link budget for the first data packet. From the link budget, the AP SIFS power controller 130-a may determine a power guidance for the transmitting node. The power guidance may be a power level adjustment or a MCS adjustment. The AP SIFS power controller 130-a may generate an ACK/BACK with the power guidance. The ACK/BACK may be generated based on a bitmap exchange, for example. This ACK/BACK may be forwarded to the AP transmitter 720.

In another example, if the device 705 is transmitting a SIFS burst, the AP receiver 710 may forward an ACK/BACK with power guidance in response to a SIFS data packet to the AP SIFS power controller 130-a. The AP SIFS power controller 130-a may interpret the power guidance within the ACK/BACK and adjust a transmit power level or MCS accordingly for a next SIFS data packet.

The AP transmitter 720 may transmit signals received from other components of the device 705. The AP transmitter 720 may transmit SIFS data packets or ACK/BACK messages to another node. In some examples, the AP transmitter 720 may be collocated with the AP receiver 710 in a transceiver.

Figure 8:
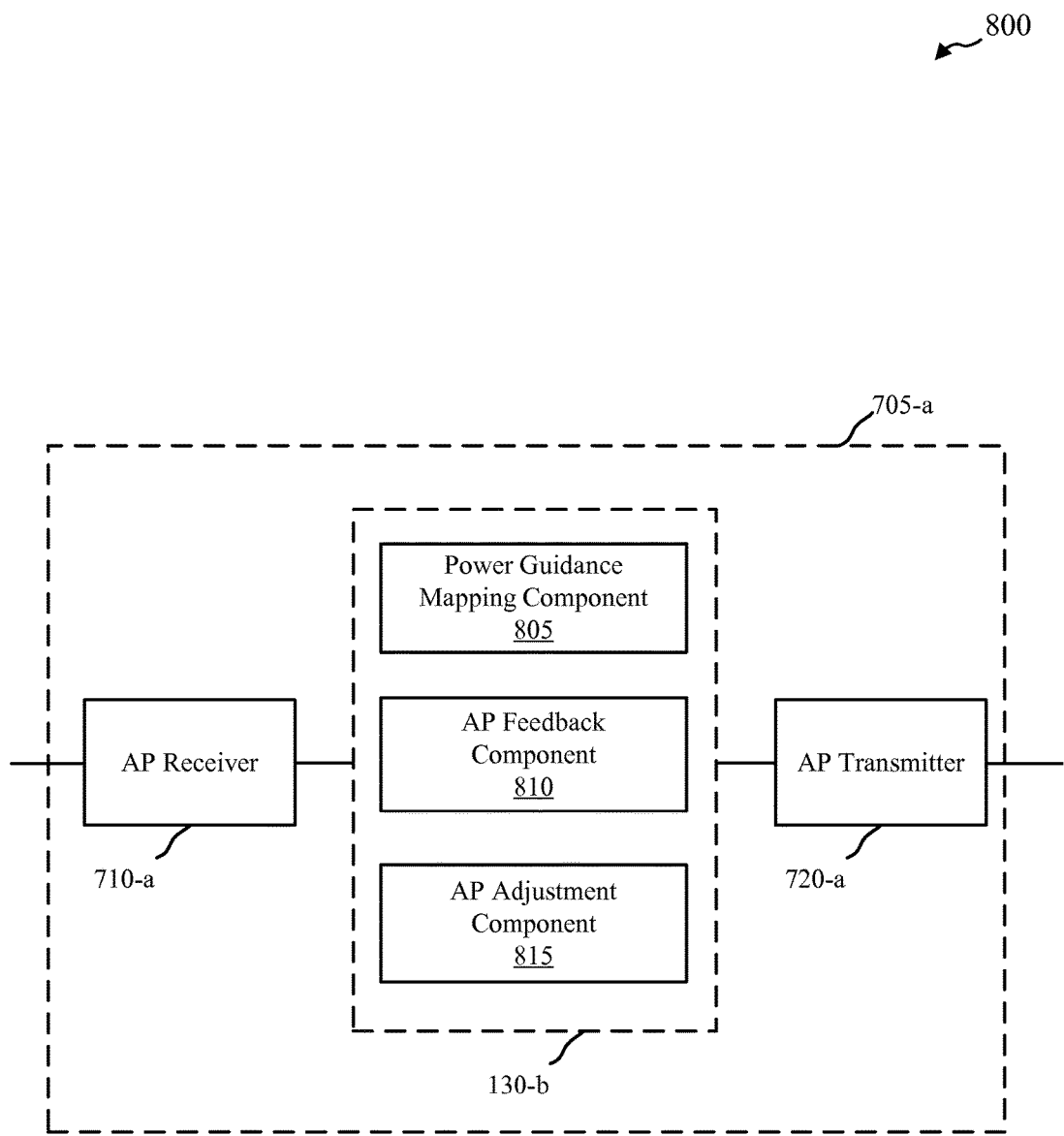
FIG. 8 shows a block diagram of a device for use in wireless communication, in accordance with various aspects of the present disclosure.

FIG. 8 shows a block diagram 800 of a device 705-a that is used in an AP for wireless communication, in accordance with various examples. The device 705-a may be an example of aspects of an AP 105 described with reference to FIGS. 1, 2, and 4-6. It may also be an example of a device 705 described with reference to FIG. 7. The device 705-a may include an AP receiver 710-a, an AP SIFS power controller 130-b, or an AP transmitter 720-a, which may be examples of the corresponding modules of device 705. The device 705-a may also include a processor. Each of these components may be in communication with each other. The AP SIFS power controller 130-b may include a power guidance mapping component 805, an AP feedback component 810, and an AP adjustment component 815. The AP receiver 710-a and the AP transmitter 720-a may perform the functions of the AP receiver 710 and the AP transmitter 720, of FIG. 7, respectively.

The power guidance mapping component 805 may map an SINR/SNR to a power level adjustment or to an MCS. For example, the power guidance mapping component 805 may determine that a link budget for a first data packet of a SIFS burst from a transmitting node indicates the transmitting node may increase or decrease a transmit power level. In another example, the power guidance mapping component 805 may determine that the power adjustment maps to a next MCS.

The AP feedback component 810 may encode the power guidance into an ACK or a BACK for data packets of a SIFS burst. For example, the AP feedback component 810 may encode a power level adjustment using four bits of a header frame-control field of an ACK. The AP feedback component 810 may do this for each received data packet in a SIFS burst. In some examples, the AP feedback component 810 may use a bitmap in encoding the power level adjustment.

The AP adjustment component 815 may adjust a transmission power level or an MCS based on closed-loop power control feedback received at the AP receiver 710-a in response to the AP transmitter 720-a transmitting SIFS burst data packets. For example, the AP adjustment component 815 may adjust a transmit power level or an MCS based on the feedback.

Figure 9:
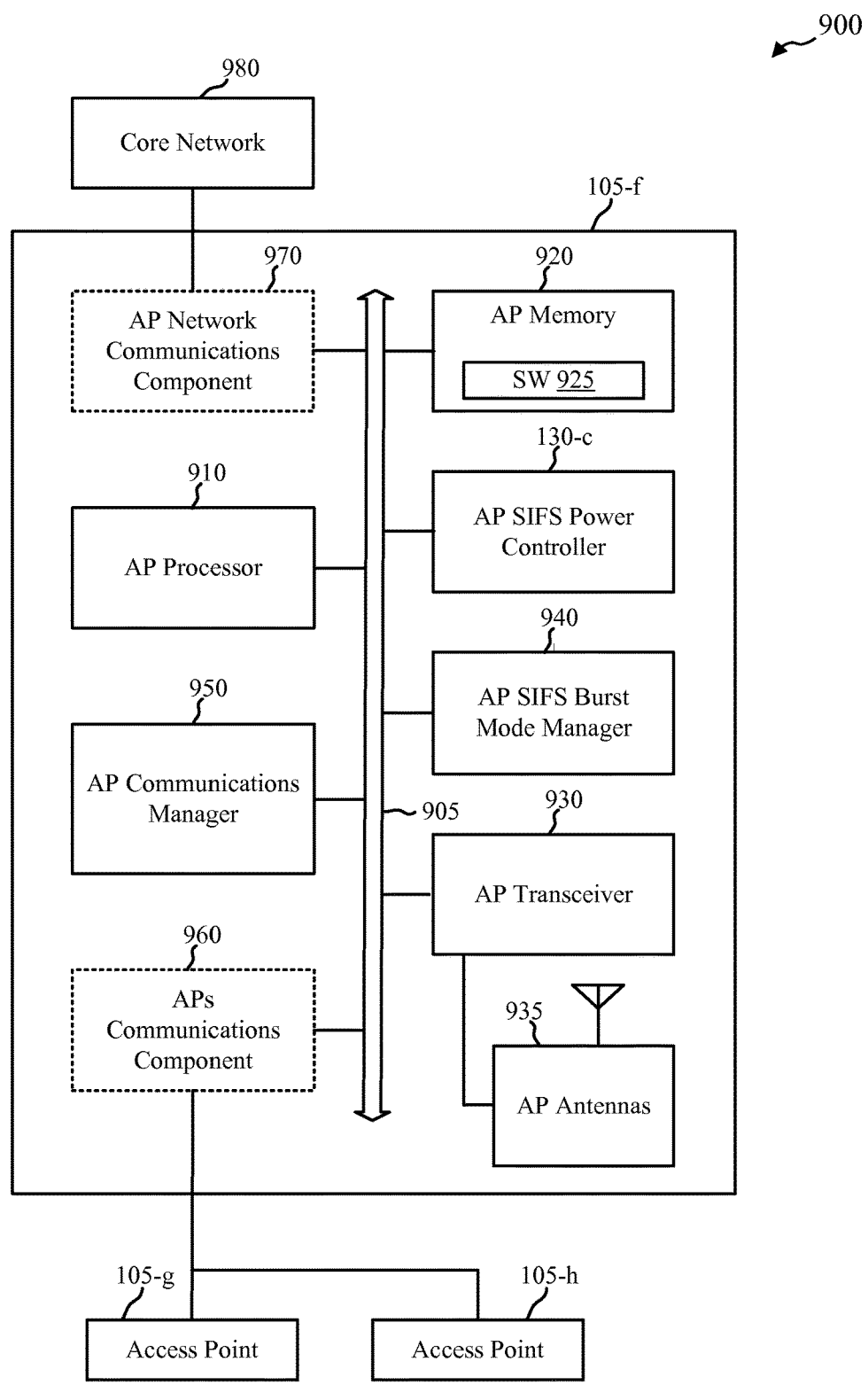
FIG. 9 shows a block diagram of a wireless communication system, in accordance with various aspects of the present disclosure.

Turning to FIG. 9, a diagram 900 is shown that illustrates an access point or AP 105-f for closed-loop power control in a SIFS burst mode, in accordance with various aspects of the present disclosure. In some aspects, the AP 105-f may be an example of the AP 105 of FIGS. 1, 2, and/or 4-6. The AP 105-f may include an AP processor 910, an AP memory 920, an AP transceiver 930, AP antennas 935, and an AP SIFS power controller 130-c. The AP SIFS power controller 130-c may be an example of the AP SIFS power controller 130 of FIGS. 7 and 8. In some examples, the AP 105-f may also include one or both of an APs communications component 960 and a AP network communications component 970. Each of these components may be in communication with each other, directly or indirectly, over at least one bus 905.

The AP memory 920 may include random access memory (RAM) and read-only memory (ROM). The AP memory 920 may also store computer-readable, computer-executable software (SW) code 925 containing instructions that, when executed, cause the AP processor 910 to perform various functions described herein for SIFS power control, for example. Alternatively, the software code 925 may not be directly executable by the AP processor 910 but cause the computer, e.g., when compiled and executed, to perform functions described herein.

The AP processor 910 may include an intelligent hardware device, e.g., a central processing unit (CPU), a microcontroller, an application-specific integrated circuit (ASIC), etc. The AP processor 910 may process information received through the AP transceiver 930, the APs communications component 960, and/or the AP network communications component 970. The AP processor 910 may also process information to be sent to the AP transceiver 930 for transmission through the AP antennas 935, to the APs communications component 960, and/or to the AP network communications component 970. The AP processor 910 may handle, alone or in connection with the AP SIFS power controller 130-c, various aspects related to SIFS burst power control.

The AP 105-f may further include an AP SIFS burst mode manager 940 that enables or disables a SIFS burst mode. The AP SIFS burst mode manager 940 may enable the SIFS burst mode based on a proximity to a target node or triggered by a vendor-proprietary protocol frame exchange.

The AP transceiver 930 may include a modem to modulate packets and provide the modulated packets to the AP antennas 935 for transmission, and to demodulate packets received from the AP antennas 935. The AP transceiver 930 may be implemented as at least one transmitter module and at least one separate receiver module. The AP transceiver 930 may communicate bi-directionally, via the AP antennas 935, with at least one wireless device 110 as illustrated in FIGS. 1, 2, and 4-6, for example. The AP 105-f may typically include multiple AP antennas 935 (e.g., an antenna array). The AP 105-f may communicate with a core network 980 through the AP network communications component 970. The AP 105-f may communicate with other APs, such as the AP 105-g and the AP 105-h, using an APs communications component 960.

According to the architecture of FIG. 9, the AP 105-f may further include an AP communications manager 950. The AP communications manager 950 may manage communications with stations and/or other devices as illustrated in the wireless communication system 100 of FIG. 1. The AP communications manager 950 may be in communication with some or all of the other components of the AP 105-f via the bus or buses 905. Alternatively, functionality of the AP communications manager 950 may be implemented as a component of the AP transceiver 930, as a computer program product, and/or as at least one controller element of the AP processor 910.

The components of the AP 105-f may implement aspects discussed above with respect to FIGS. 1-8, and those aspects may not be repeated here for the sake of brevity. Moreover, the components of the AP 105-f may implement aspects discussed below with respect to FIGS. 13 and 14 and those aspects may not be repeated here also for the sake of brevity.

Figure 10:
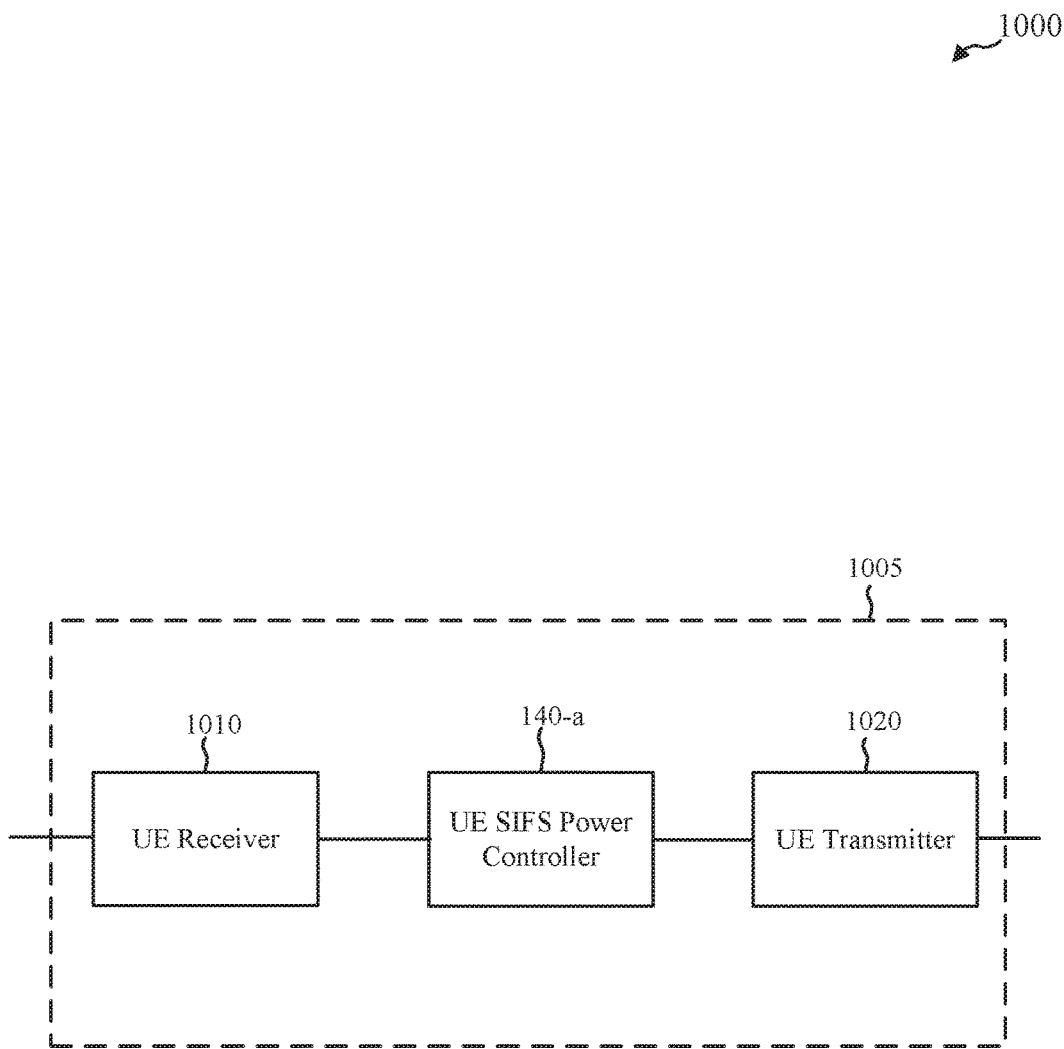
FIG. 10 shows a block diagram of an apparatus for use in wireless communication, in accordance with various aspects of the present disclosure.

FIG. 10 shows a block diagram 1000 of an apparatus 1005 for use in a wireless device for wireless communication, in accordance with various aspects of the present disclosure. In some examples, the apparatus 1005 may be an example of aspects of the wireless devices 110 described with reference to FIGS. 1, 2, 4, and/or 5. The apparatus 1005 may also be or include a processor. The apparatus 1005 may include a UE receiver 1010, a UE SIFS power controller 140-a, and/or a UE transmitter 1020. Each of these modules may be in communication with each other.

The apparatus 1005, through the UE receiver 1010, the UE SIFS power controller 140-a, and/or the UE transmitter 1020, may perform functions described herein. For example, the apparatus 1005 may act upon the guidance in an ACK/BACK for a next transmission data frame after a SIFS duration by backing off or adding back a power guidance level to a power amplifier of the apparatus 1005.

The UE receiver 1010 may receive information such as packets, user data, and/or control information associated with various information channels (e.g., control channels, data channels, etc.). The UE receiver 1010 may receive power guidance in response to data packets in a SIFS burst. The UE receiver 1010 may also receive a SIFS burst mode enablement message, SIFS burst data packets, or a bitmap exchange. Information may be passed on to the UE SIFS power controller 140-a, and to other components of the apparatus 1005.

The UE SIFS power controller 140-a may provide the UE transmitter 1020 with a SIFS burst mode enablement message, data packets for transmission in a SIFS burst, or a bitmap exchange. The UE SIFS power controller 140-a may determine whether to enable the SIFS power control feature based on a proximity to an AP or a protocol frame exchange.

The UE transmitter 1020 may transmit the signals received from other components of the apparatus 1005. The UE transmitter 1020 may transmit SIFS burst data packets, SIFS burst mode enablement messages, and acknowledgements (e.g., ACK/BACK). In some examples, the UE transmitter 1020 may be collocated with the UE receiver 1010 in a transceiver module. The UE transmitter 1020 may include a single antenna, or it may include a plurality of antennas.

Figure 11:
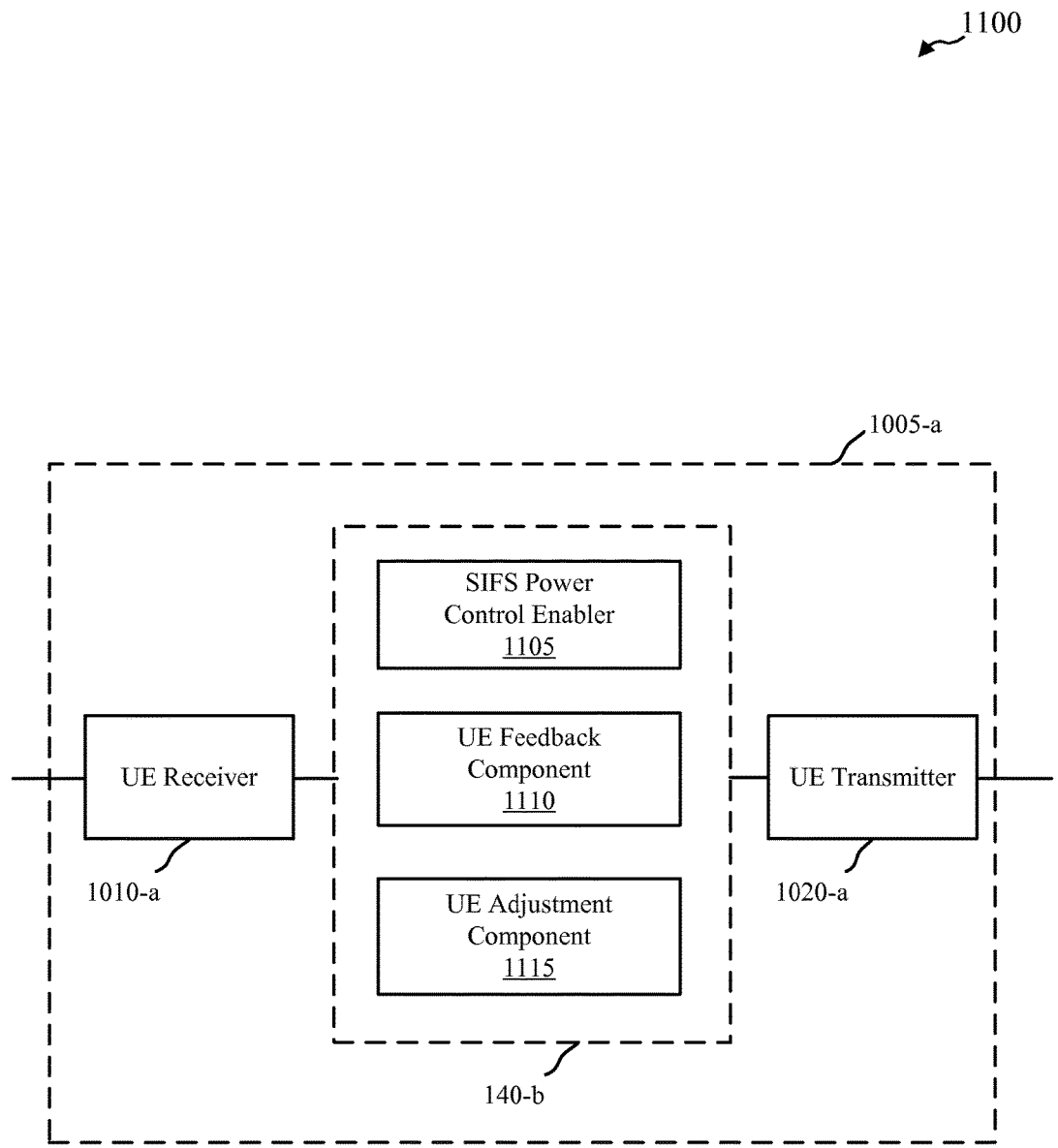
FIG. 11 shows a block diagram of an apparatus for use in wireless communication, in accordance with various aspects of the present disclosure.

FIG. 11 shows a block diagram 1100 of an apparatus 1005-a that is used in a wireless station for wireless communication, in accordance with various examples. The apparatus 1005-a may be an example of aspects of a wireless device 110 described with reference to FIGS. 1, 2, 4, and/or 5. It may also be an example of an apparatus 1005 described with reference to FIG. 10. The apparatus 1005-a may include a UE receiver 1010-a, a UE SIFS power controller 140-b, or a UE transmitter 1020-a, which may be examples of the corresponding modules of apparatus 1005. The apparatus 1005-a may also include a processor. Each of these modules may be in communication with each other. The UE SIFS power controller 140-b may include a SIFS power control enabler 1105, a UE feedback component 1110, and a UE adjustment component 1115. The UE receiver 1010-a and the UE transmitter 1020-a may perform the functions of the UE receiver 1010 and the UE transmitter 1020, of FIG. 10, respectively.

The SIFS power control enabler 1105 may enable or disable the SIFS power control feature. The SIFS power control enabler 1105 may determine a proximity between the apparatus 1005-a and an AP. If the proximity is greater than or equal to a threshold distance, the SIFS power control enabler 1105 may enable the feature. If the proximity is less than a threshold distance, the SIFS power control enabler 1105 may disable the feature or keep the feature disabled.

The UE feedback component 1110 may interpret power guidance from an ACK/BACK received at the UE receiver 1010-a in response to a SIFS burst data packet. The UE feedback component 1110 may identify a transmission power adjustment or an MCS adjustment from the power guidance. In another example, the UE feedback component 1110 may encode power guidance into an ACK or a BACK for data packets of a SIFS burst received at the UE receiver 1010-a. For example, the UE feedback component 1110 may encode a power level adjustment using four bits of a header frame-control field of an ACK. The UE feedback component 1110 may do this for each received ACK/BACK or data packet in a SIFS burst. In some examples, the UE feedback component 1110 may use a bitmap in interpreting or encoding the power level adjustment.

The UE adjustment component 1115 may adjust a transmission power level or an MCS based on closed-loop power control feedback received at the UE receiver 1010-a in response to the UE transmitter 1120-a transmitting SIFS burst data packets. For example, the UE adjustment component 1115 may adjust a transmit power level or an MCS based on the feedback.

Figure 12:
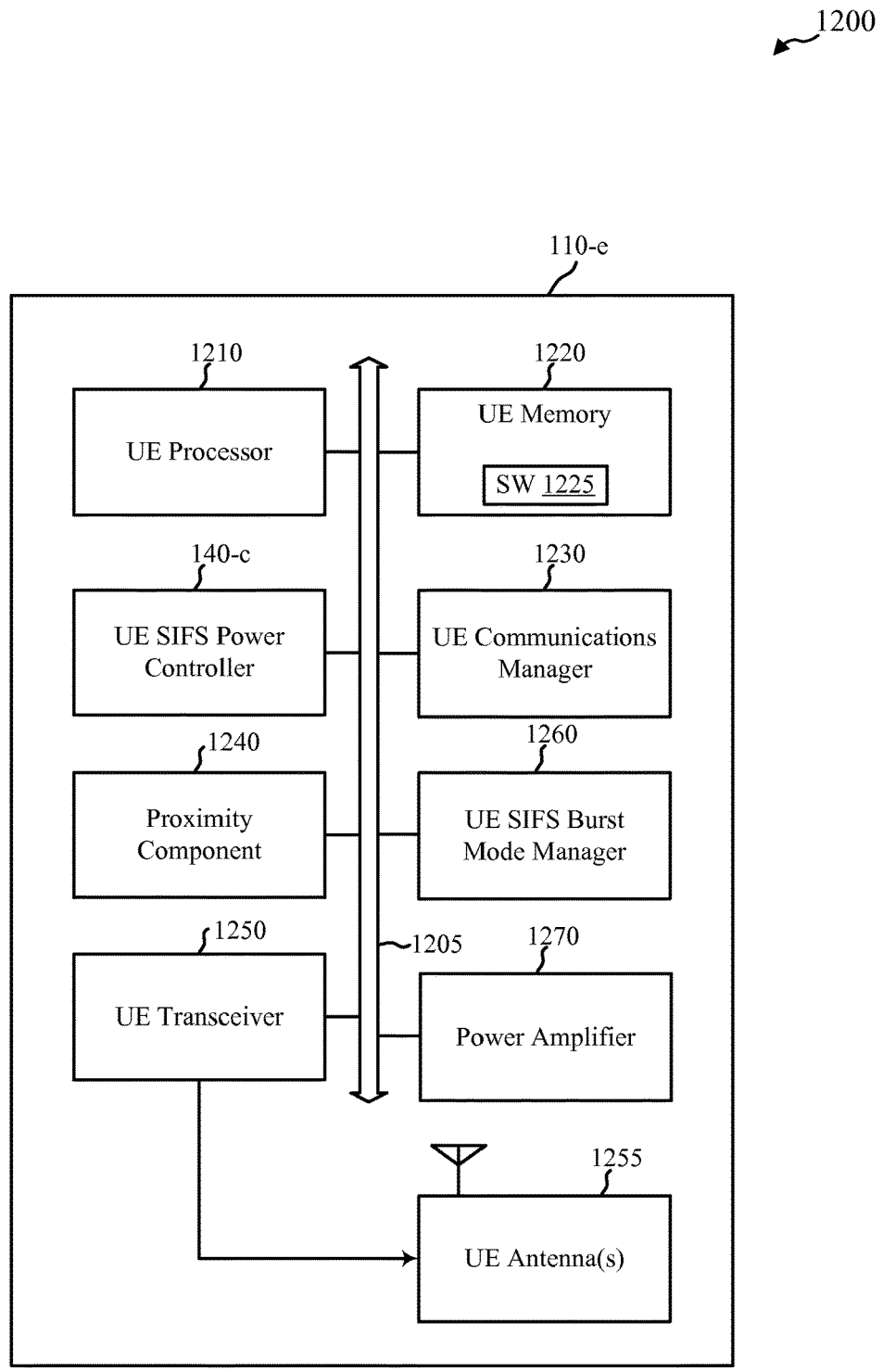
FIG. 12 shows a block diagram of a wireless station for use in wireless communication, in accordance with various aspects of the present disclosure.

Turning to FIG. 12, a diagram 1200 is shown that illustrates a wireless device 110-e for use in SIFS burst power control, in accordance with various aspects of the present disclosure. The wireless device 110-e may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The wireless device 110-e may have an internal power supply, such as a small battery, to facilitate mobile operation. The wireless device 110-e may be an example of the wireless devices 110 of FIGS. 1, 2, 4, and/or 5.

The wireless device 110-e may include a UE processor 1210, a UE memory 1220, a UE communications manager 1230, a proximity component 1240, a UE transceiver 1250, UE antenna(s) 1255, and a UE SIFS power controller 140-c. The UE SIFS power controller 140-c may be an example of the UE SIFS power controller 140 of FIGS. 1, 10, and/or 11. Each of these modules may be in communication with each other, directly or indirectly, over at least one bus 1205.

The UE memory 1220 may include RAM and ROM. The UE memory 1220 may store computer-readable, computer-executable software (SW) code 1225 containing instructions that, when executed, cause the UE processor 1210 to perform various functions described herein for transmission schedule adjustments. Alternatively, the software code 1225 may not be directly executable by the UE processor 1210 but cause the computer (e.g., when compiled and executed) to perform functions described herein.

The UE processor 1210 may include an intelligent hardware device, e.g., a CPU, a microcontroller, an ASIC, etc. The UE processor 1210 may process information received through the UE transceiver 1250. The UE processor 1210 may handle, alone or in connection with the UE SIFS power controller 140-c, various aspects for SIFS power control.

The UE transceiver 1250 may include a modem to modulate packets and provide the modulated packets to the UE antennas 1255 for transmission, and to demodulate packets received from the UE antennas 1255. The UE transceiver 1250 may be implemented as at least one transmitter and at least one separate receiver. The UE transceiver 1250 may communicate bi-directionally with a network device, such as an AP 105 as in FIGS. 1, 2, 4-6, and/or 9. The wireless device 110-d may include multiple UE antennas 1255 (e.g., an antenna array).

According to the architecture of FIG. 12, the wireless device 110-e may further include a UE communications manager 1230. The UE communications manager 1230 may manage communications with various nodes such as AP 105 described herein with reference to FIGS. 1, 2, 4-6, and 9. The UE communications manager 1230 may be a component of the wireless device 110-e in communication with some or all of the other components of the wireless device 110-e over the at least one bus 1205. Alternatively, functionality of the UE communications manager 1230 may be implemented as a component of a transceiver 1250, as a computer program product, and/or as at least one controller element of the UE processor 1210.

The wireless device 110-e may further include a proximity component 1240. The proximity component 1240 may determine a proximity of the wireless device 110-e to an AP. The wireless device 110-e may further include a UE SIFS burst mode manager 1260. The UE SIFS burst mode manager 1260 may enable or disable a SIFS burst mode based on the proximity or a protocol frame exchange.

The wireless device 110-e may also include a power amplifier 1270. The power amplifier 1270 may be used to set a transmission power level for SIFS burst data packets. For example, the UE SIFS power controller 140-c may increase or decrease a transmission power level of the power amplifier 1270 based on power control feedback.

The components of the wireless device 110-e may implement aspects discussed above with respect to FIGS. 1, 2, 4-5, 10, and 11, and those aspects may not be repeated here for the sake of brevity. Moreover, the components of the wireless device 110-e may implement aspects discussed below with respect to FIGS. 13-15, and those aspects may not be repeated here also for the sake of brevity.

The components of the devices 705 and 705-a, the AP 105-f, the apparatuses 1005 and 1005-a, and the wireless device 110-e may, individually or collectively, be implemented using ASICs adapted to perform some or all of the applicable functions in hardware. Alternatively, the functions may be performed by other processing units (or core), on integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by general or application-specific processors.

Figure 13:
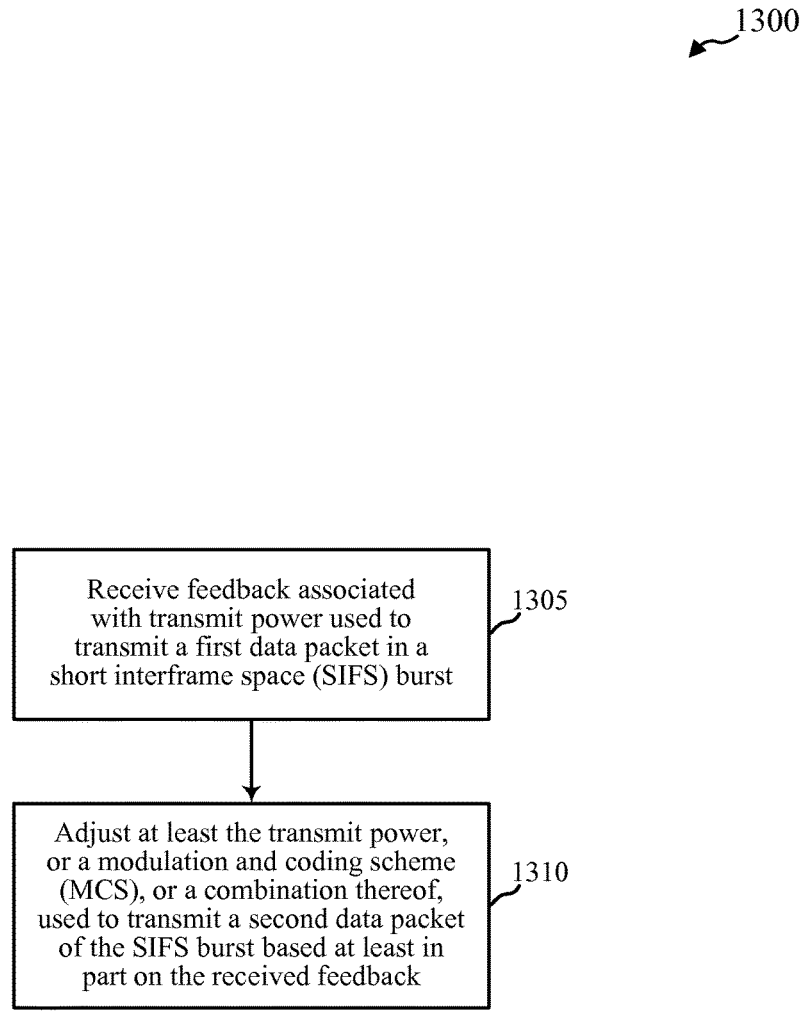
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. The method 1300 may apply to aspects of the AP 105 described with reference to FIGS. 1, 2, 4-6, and/or 9, and/or aspects of the device 705 described with reference to FIGS. 7 and/or 8. The method 1300 may also apply to aspects of the wireless device 110 described with reference to FIGS. 1, 2, 4-6, and/or 12, and/or aspects of the apparatus 1005 described with reference to FIGS. 10 and/or 11. In some examples, a wireless device or the AP may execute sets of codes to control the functional elements of the wireless device or the AP to perform the functions described below. Additionally or alternatively, the wireless device or the AP may perform of the functions described below using-purpose hardware.

At block 1305, the method 1300 may include receiving feedback associated with transmit power used to transmit a first data packet in a SIFS burst. Receiving the feedback may further include receiving an ACK or Block-ACK for the first data packet. In some examples, receiving the feedback may also include identifying a step size for a transmit power adjustment from a header frame of the ACK or Block-ACK.

The method 1300 may further include adjusting at least the transmit power, or a MCS, or a combination thereof, used to transmit a second data packet of the SIFS burst based at least in part on the received feedback at block 1310. In some examples of the method 1300, adjusting the transmit power may further include adjusting the transmit power based at least in part on the identified step size. In some examples, adjusting the transmit power may further include identifying a plurality of bits in the header frame that correspond to one of a plurality of power adjustments. Identifying the step size may further include determining that the step size maps to a next MCS level and changing the MCS to the next MCS level to transmit the second data packet.

The method 1300 may further include transmitting the second data packet in the SIFS burst using the adjusted transmit power or the adjusted MCS. The method may also include receiving feedback associated with transmit power used to transmit the second data packet in the SIFS burst and adjusting at least a transmit power, or a MCS, or a combination thereof for a third data packet of the SIFS burst based at least in part on the received feedback associated with the transmit power used to transmit the second data packet.

In some examples, the method 1300 may further include exchanging a bitmap during an initial setup phase, the bitmap indicating a plurality of bits in a header frame to use to indicate one of a plurality of power adjustments. The method 1300 may further include determining that a wireless device is operating in a SIFS burst mode and enabling a transmit power control based at least in part on the occurrence of a condition while operating in the SIFS burst mode. The occurrence of the condition may include at least an average beacon RSSI of at least the first data packet is greater than or equal to an RSSI threshold, or a range of the first wireless device to a second wireless device being within a threshold distance, or a protocol frame exchange triggered by the first wireless device, or a combination thereof.

The operation(s) at blocks 1305 and 1310 may be performed using the AP SIFS power controller 130 described with reference to FIGS. 1 and 7-9 or the UE SIFS power controller 140 described with reference to FIGS. 1 and 10-12. Thus, the method 1300 may provide for wireless communication. It should be noted that the method 1300 is just one implementation and that the operations of the method 1300 may be rearranged or otherwise modified such that other implementations are possible.

Figure 14:
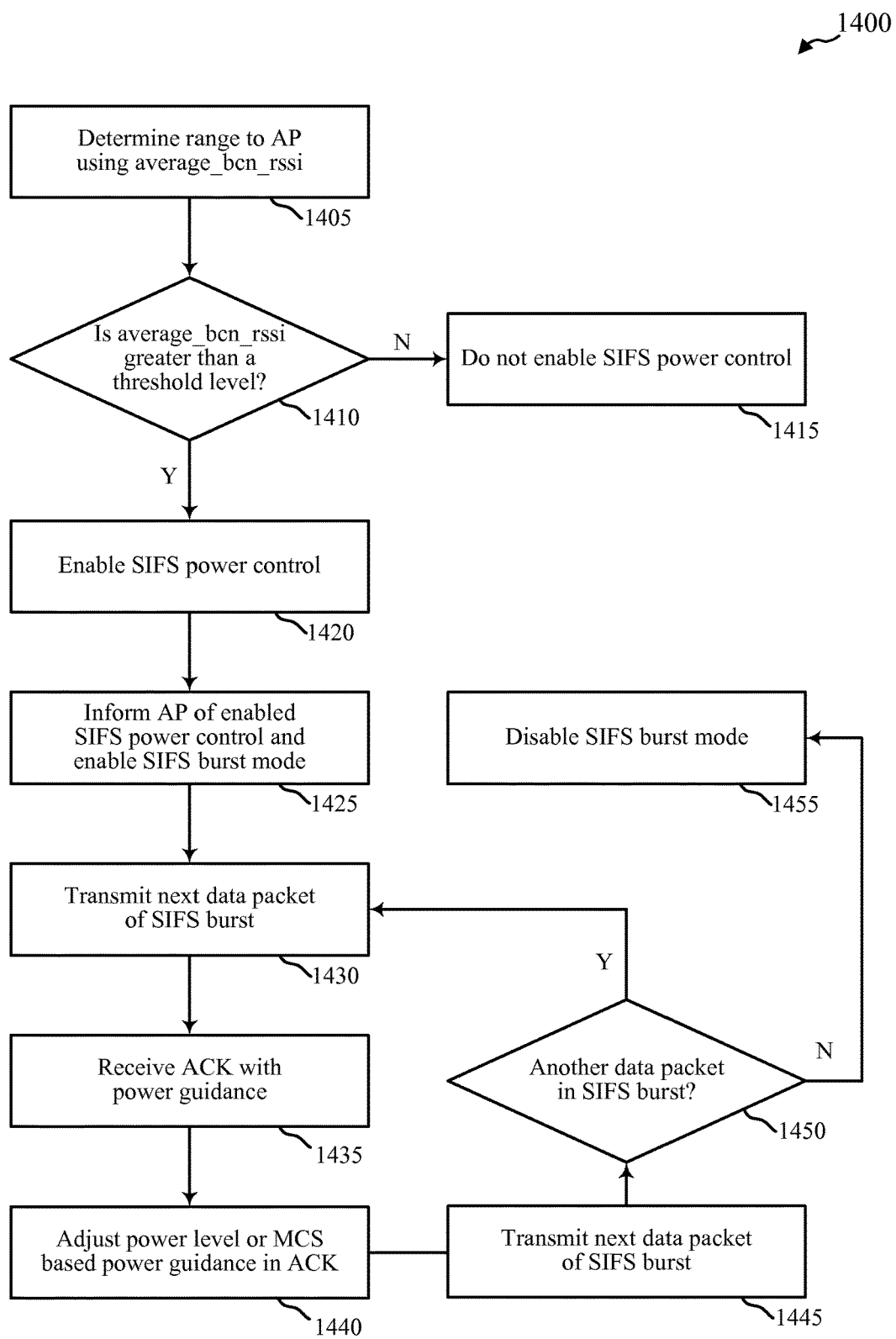
FIG. 14 is a flow chart illustrating an example of a method for power level adjustments in wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of the wireless devices 110 described with reference to FIGS. 1, 2, 4, 5, and/or 12, and/or aspects of the apparatus 1005 described with reference to FIGS. 10 and/or 11. In some examples, a wireless device 110 may execute sets of codes to control the functional elements of the wireless device to perform the functions described below. Additionally or alternatively, the wireless device may perform of the functions described below using-purpose hardware. In other examples, another network device besides a wireless device may perform the method 1500.

At block 1405, the method 1400 may include determining a range to an AP using an average_bcn_rssi value. The method 1400 determines whether the average_bcn_rssi value is greater than, or greater than or equal to, an RSSI threshold level at block 1410. If the average_bcn_rssi value is less than or equal to, or less than, the RSSI threshold level, the method 1400 proceeds to block 1415. At block 1415, the method 1400 chooses not to enable the SIFS power control feature.

However, if the average_bcn_rssi value is greater than, or greater than or equal to, the RSSI threshold level, the method 1400 proceeds to block 1420 where the SIFS power control is enabled. The method 1400 may further include transmitting an enablement of the SIFS power control at block 1425. The block 1425 may further enable a SIFS burst mode.

If the wireless device gains access to the medium, the wireless device transmits a next data packet of the SIFS burst at block 1430. In response to a successful transmission, the method 1400 includes receiving an ACK or BACK with power guidance at block 1435. The method 1400 may further include interpreting the power guidance in the ACK/BACK. Based on the power guidance, the method 1400 includes adjusting the transmit power level or the MCS at block 1440.

With the adjusted transmit power level or the MCS, the method 1400 includes transmitting the next data packet in the SIFS burst at block 1445. The method 1400 next queries if there is another data packet in the SIFS burst to transmit at block 1450. If there is another data packet to transmit, the method 1400 returns to block 1430 to transmit the next data packet. The method 1400 proceeds to receive an ACK/BACK with power guidance, adjust the power level or MCS as appropriate to the power guidance, transmitting a next data packet, if it exists. If there are no more data packets to transmit, the method 1400 proceeds to block 1455 to disable the SIFS burst mode.

The operation(s) at block 1405 may be performed using the UE SIFS power controller 140 described with reference to FIGS. 1 and 10-12. Thus, the method 1400 may provide for wireless communication. It should be noted that the method 1400 is just one implementation and that the operations of the method 1400 may be rearranged or otherwise modified such that other implementations are possible.

Figure 15:
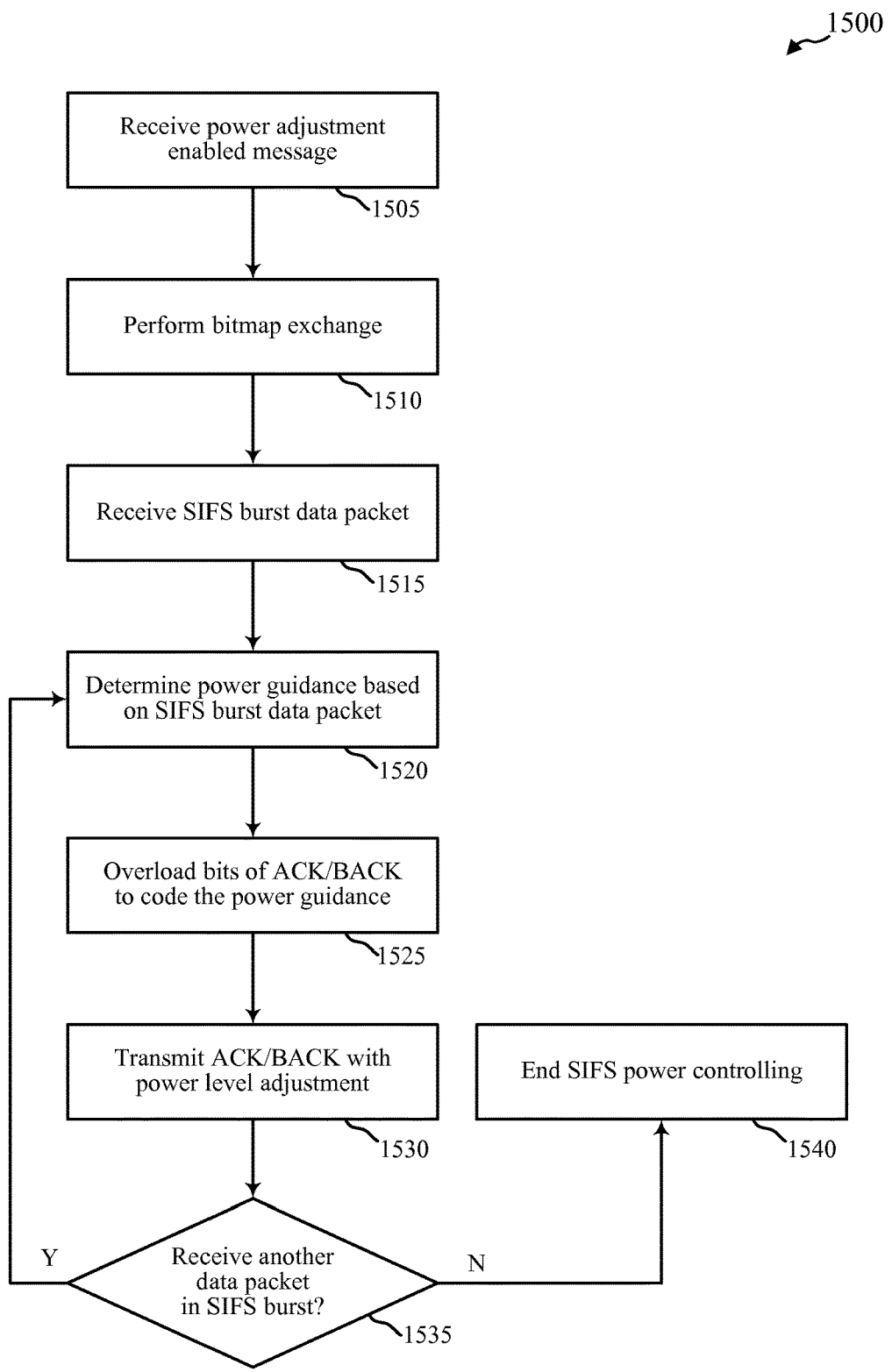
FIG. 15 is a flow chart illustrating an example of a method for providing power guidance, in accordance with various aspects of the present disclosure.

FIG. 15 is a flow chart illustrating an example of a method 1500 for wireless communication, in accordance with various aspects of the present disclosure. For clarity, the method 1500 is described below with reference to the AP 105 described with reference to FIGS. 1, 2, 4-6, and/or 9, and/or aspects of the device 705 described with reference to FIGS. 7 and/or 8. In some examples, an AP 105 may execute sets of codes to control the functional elements of the AP 105 to perform the functions described below. Additionally or alternatively, the AP 105 may perform of the functions described below using-purpose hardware.

At block 1505, the method 1500 may include receiving, by an AP, a power adjustment enablement message. The power adjustment enable message indicates to the AP that another node, such as a wireless device 110, is enabling a power control feature for a SIFS burst. At block 1510, the method 1500 causes the AP to perform a bitmap exchange with the wireless device. The bitmap exchange may define bits to be used in an ACK/BACK for indicating power guidance.

At block 1515, the method 1500 may include receiving a SIFS burst data packet. The SIFS burst data packet may be the first packet in a series of data packets. At block 1520, the method 1500 may include determining power guidance for a next data packet based on the SIFS burst date packet. In some examples, the AP may determine a minimum power level for a next data packet based on the SIFS burst date packet.

At block 1525, the method 1500 may include overloading bits of the ACK/BACK to encode the power guidance into the ACK/BACK. The power guidance may be an adjustment to a transmit power level or an MCS level. The AP 105 may transmit the ACK/BACK with the power level adjustment at block 1530.

At block 1535, the method 1500 determines whether the AP has received another data packet in the same SIFS burst. If the AP has not received another data packet, the method 1500 ends the SIFS power control at block 1540. On the other hand, if the AP does receive another data packet in the same SIFS burst, the method 1500 proceeds to block 1520 to determine a new power guidance for the most recently received data packet. The method 1500 continues to provide power guidance feedback until the AP no longer receives data packets from the SIFS burst.

The operation(s) at block 1505-1540 may be performed using the AP SIFS power controller 130 described with reference to FIGS. 1, 7, 8, and/or 9. Thus, the method 1500 may provide for wireless communication. It should be noted that the method 1500 is just one implementation and that the operations of the method 1500 may be rearranged or otherwise modified such that other implementations are possible.

In some examples, aspects from two or more of the methods 1300, 1400, and 1500 may be combined. It should be noted that the methods 1300, 1400, and 1500 are just example implementations, and that the operations of the methods 1300, 1400, and 1500 may be rearranged or otherwise modified such that other implementations are possible.

Thus, mechanisms are described where a SIFS-burst transmission is received based on guided power control from a receiving node, such as the AP, in a way that improves an overall transmission power adaptively without sacrificing the burst integrity and the bursting process.

The detailed description set forth above in connection with the appended drawings describes examples and does not represent the only examples that may be implemented or that are within the scope of the claims. The term "example," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), flash memory, compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:

receiving feedback associated with a transmitter power output used to transmit a first data packet in a short interframe space (SIFS) burst, wherein the received feedback comprises an acknowledgement (ACK) or block-ACK responsive to the transmitted first data packet;

identifying a step size for a transmitter power output adjustment from a header frame of the ACK or block-ACK; and adjusting the transmitter power output used to transmit a second data packet of the SIFS burst based at least in part on the received feedback and the identified step size, wherein the first data packet and the second data packet are separated by a SIFS of the SIFS burst and the feedback is received during the SIFS.

2. The method of claim 1, further comprising:
transmitting the second data packet in the SIFS burst using the adjusted transmitter power output.

3. The method of claim 2, further comprising:
receiving feedback associated with a transmitter power output used to transmit the second data packet in the SIFS burst; and
adjusting a transmitter power output for a third data packet of the SIFS burst based at least in part on the received feedback associated with the transmitter power output used to transmit the second data packet.

4. The method of claim 1, further comprising:
identifying a plurality of bits in the header frame that correspond to one of a plurality of power adjustments.

5. The method of claim 1, further comprising:
adjusting a modulation and coding scheme (MCS) used to transmit the second data packet of the SIFS burst based at least in part on the received feedback.

6. The method of claim 5, wherein identifying the step size further comprises:
determining that the step size maps to a next MCS level; and
changing the MCS to the next MCS level to transmit the second data packet.

7. The method of claim 1, further comprising:
exchanging a bitmap during an initial setup phase, the bitmap indicating a plurality of bits in a header frame to use to indicate one of a plurality of power adjustments.

8. The method of claim 1, further comprising:
enabling a transmitter power output control feature based at least in part on an occurrence of a condition while operating in a SIFS burst mode.

9. The method of claim 8, wherein the occurrence of the condition comprises at least an average beacon received signal strength indication (RSSI) greater than or equal to an RSSI threshold, or a range of a first wireless device to a second wireless device being within a threshold distance, or a protocol frame exchange triggered by the first wireless device, or a combination thereof.

10. An apparatus for wireless communication, comprising:
a feedback component to:
receive feedback associated with a transmitter power output used to transmit a first data packet in a short interframe space (SIFS) burst, wherein the received feedback comprises an acknowledgement (ACK) or block-ACK responsive to the transmitted first data packet;
identify a step size for a transmitter power output adjustment from a header frame of the ACK or block-ACK; and
an adjustment component to adjust the transmitter power output used to transmit a second data packet of the SIFS burst based at least in part on the received feedback and the identified step size, wherein the first data packet and the second data packet are separated by a SIFS of the SIFS burst and the feedback is received during the SIFS.

11. The apparatus of claim 10, further comprising:
a transmitter to transmit the second data packet in the SIFS burst using the adjusted transmitter power output.

12. The apparatus of claim 11, wherein:
the feedback component is to further receive feedback associated with a transmitter power output used to transmit the second data packet in the SIFS burst, and
the adjustment component is to further adjust at least a transmitter power output for a third data packet of the SIFS burst based at least in part on the received feedback associated with the transmitter power output used to transmit the second data packet.

13. The apparatus of claim 10, wherein the feedback component is to further identify a plurality of bits in the header frame that correspond to one of a plurality of power adjustments.

14. The apparatus of claim 10, wherein the adjustment component is to further adjust a modulation and coding scheme (MCS) used to transmit the second data packet of the SIFS burst based at least in part on the received feedback.

15. The apparatus of claim 14, wherein:
the feedback component is to further determine that the step size maps to a next MCS level, and
the adjustment component is to further change the MCS to the next MCS level to transmit the second data packet.

16. The apparatus of claim 10, further comprising:
a SIFS power control enabler to exchange a bitmap during an initial setup phase, the bitmap indicating a plurality of bits in a header frame to use to indicate one of a plurality of power adjustments.

17. The apparatus of claim 10, further comprising:
a SIFS burst mode manager to enable a transmitter power output control feature based at least in part on an occurrence of a condition while operating in a SIFS burst mode.

18. The apparatus of claim 17, wherein the occurrence of the condition comprises at least an average beacon received signal strength indication (RSSI) greater than or equal to an RSSI threshold, or a range of a first wireless device to a second wireless device being within a threshold distance, or a protocol frame exchange triggered by the first wireless device, or a combination thereof.

19. An apparatus for wireless communication, comprising:
means for receiving feedback associated with a transmitter power output used to transmit a first data packet in a short interframe space (SIFS) burst, wherein the received feedback comprises an acknowledgement (ACK) or block-ACK responsive to the transmitted first data packet;
means for identifying a step size for a transmitter power output adjustment from a header frame of the ACK or block-ACK; and
means for adjusting the transmitter power output used to transmit a second data packet of the SIFS burst based at least in part on the received feedback and the identified step size, wherein the first data packet and the second data packet are separated by a SIFS of the SIFS burst and the feedback is received during the SIFS.

20. The apparatus of claim 19, further comprising:
means for transmitting the second data packet in the SIFS burst using the adjusted transmitter power output.

21. The apparatus of claim 19, wherein means for receiving feedback further comprises:
means for identifying a plurality of bits in the header frame that correspond to one of a plurality of power adjustments.

22. The apparatus of claim 19, further comprising:
means for exchanging a bitmap during an initial setup phase, the bitmap indicating a plurality of bits in a header frame to use to indicate one of a plurality of power adjustments.

23. The apparatus of claim 19, further comprising:
means for adjusting a modulation and coding scheme (MCS) used to transmit the second data packet of the SIFS burst based at least in part on the received feedback.

24. The apparatus of claim 23, wherein the means for identifying the step size further comprises:
means for determining that the step size maps to a next MCS level; and
means for changing the MCS to the next MCS level to transmit the second data packet.

25. A non-transitory computer-readable medium storing computer-executable code for wireless communication, the code executable by a processor to:
receive feedback associated with a transmitter power output used to transmit a first data packet in a short interframe space (SIFS) burst, wherein the received feedback comprises an acknowledgement (ACK) or block-ACK responsive to the transmitted first data packet;
identify a step size for a transmitter power output adjustment from a header frame of the ACK or block-ACK; and
adjust the transmitter power output used to transmit a second data packet of the SIFS burst based at least in part on the received feedback and the identified step size, wherein the first data packet and the second data packet are separated by a SIFS of the SIFS burst and the feedback is received during the SIFS.

26. The non-transitory computer-readable medium of claim 25, the code being further executable by the processor to:
transmit the second data packet in the SIFS burst using the adjusted transmitter power output.

27. The non-transitory computer-readable medium of claim 25, the code being further executable by the processor to:
identify a plurality of bits in the header frame that correspond to one of a plurality of power adjustments.

28. The non-transitory computer-readable medium of claim 25, the code being further executable by the processor to:
exchange a bitmap during an initial setup phase, the bitmap indicating a plurality of bits in a header frame to use to indicate one of a plurality of power adjustments.

29. The non-transitory computer-readable medium of claim 25, the code being further executable by the processor to:
adjust a modulation and coding scheme (MCS) used to transmit the second data packet of the SIFS burst based at least in part on the received feedback.

30. The non-transitory computer-readable medium of claim 29, the code for identifying the step size being further executable by the processor to:
determine that the step size maps to a next MCS level; and
change the MCS to the next MCS level to transmit the second data packet.

* * * * *